United States Patent
Soneda et al.

(10) Patent No.: US 7,536,068 B2
(45) Date of Patent: May 19, 2009

(54) MICRO MOVABLE ELEMENT AND OPTICAL SWITCHING DEVICE

(75) Inventors: Hiromitsu Soneda, Kawasaki (JP); Xiaoyu Mi, Kawasaki (JP); Hisao Okuda, Kawasaki (JP); Osamu Tsuboi, Kawasaki (JP); Norinao Kouma, Kawasaki (JP); Satoshi Ueda, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 272 days.

(21) Appl. No.: 11/385,657

(22) Filed: Mar. 22, 2006

(65) Prior Publication Data

US 2006/0233487 A1    Oct. 19, 2006

(30) Foreign Application Priority Data

Apr. 15, 2005   (JP)   .............................. 2005-117841

(51) Int. Cl.
  *G02B 6/26*  (2006.01)
(52) U.S. Cl. .............................. 385/18; 385/15; 385/16; 385/17; 359/224; 359/223; 359/196; 359/900
(58) Field of Classification Search ................... 349/39, 349/38, 84, 73, 74, 141; 257/E23.145, E23.142; 438/48
See application file for complete search history.

(56) References Cited

U.S. PATENT DOCUMENTS

| 6,262,827 | B1 * | 7/2001 | Ueda et al. ................... 359/224 |
| 6,423,563 | B2 | 7/2002 | Fukada et al. |
| 6,668,109 | B2 * | 12/2003 | Nahum et al. ................... 385/18 |
| 2002/0006248 | A1 * | 1/2002 | Makino et al. ................ 385/18 |
| 2003/0016906 | A1 * | 1/2003 | Utsunomiya ................. 385/18 |
| 2004/0028321 | A1 * | 2/2004 | Sunaga et al. ................. 385/18 |

FOREIGN PATENT DOCUMENTS

| JP | 10-190007 | 7/1998 |
| JP | 10-270714 | 10/1998 |
| JP | 2000-31502 | 1/2000 |

* cited by examiner

Primary Examiner—James P Hughes
(74) Attorney, Agent, or Firm—Kratz, Quintos & Hanson, LLP.

(57) ABSTRACT

A micro movable element includes a micro movable substrate, a package base and an electroconductive connector. The micro movable substrate is provided with a micro movable unit that includes a frame, a pivotally movable portion, a torsion connector connecting the frame and the movable portion, and an actuator to generate driving force for the pivotal motion of the movable portion. The package base includes an internal interconnect structure. The electroconductive connector is provided between the micro movable substrate and the package base for electrically connecting the actuator and the internal interconnect structure to each other.

20 Claims, 16 Drawing Sheets

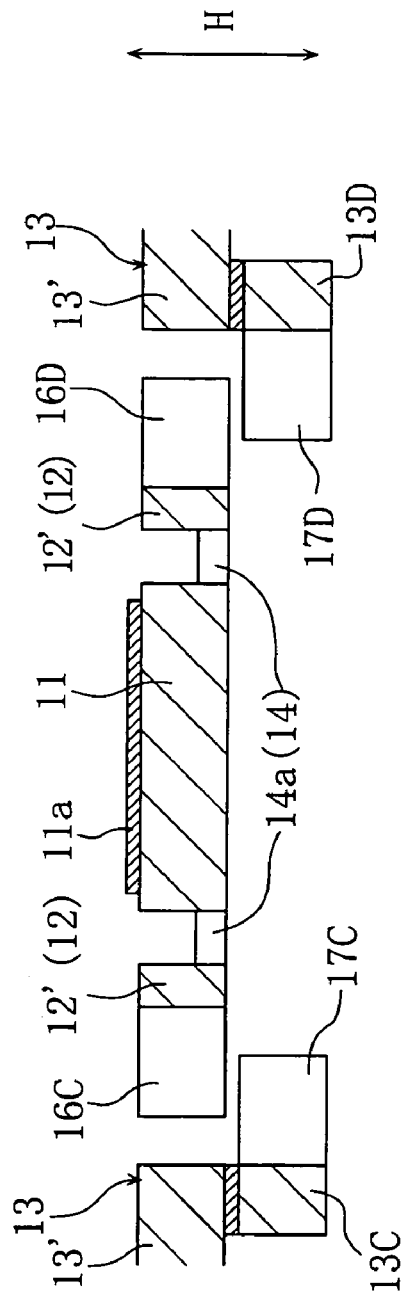
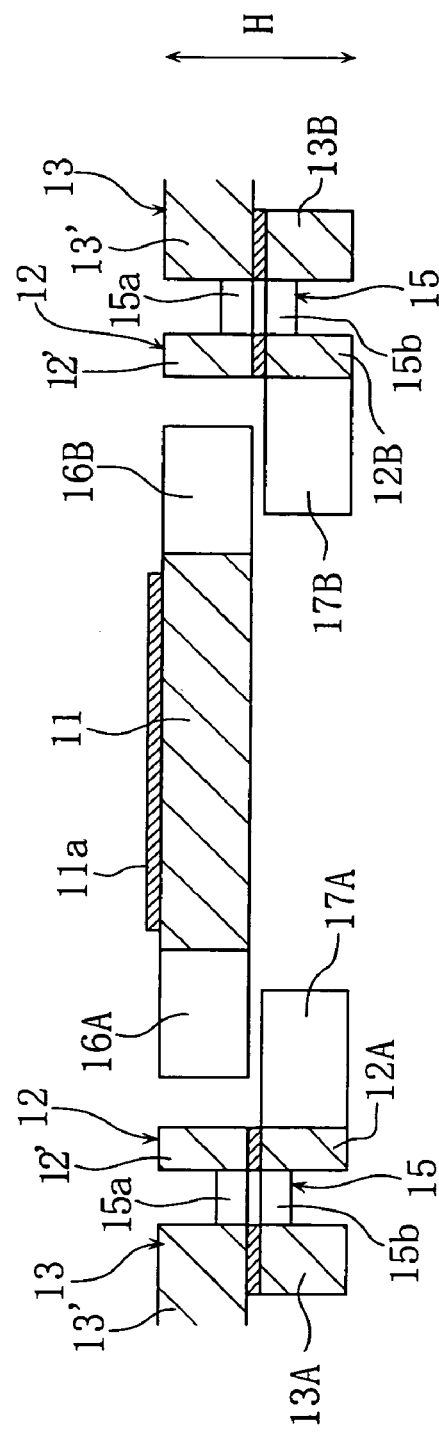

MICRO MOVABLE ELEMENT AND OPTICAL SWITCHING DEVICE

BACKGROUND OF THE INVENTION

1. Field of the Invention

The present invention relates to a micro movable element, such as a micromirror or a gyro sensor, that includes a pivotable unit. The present invention also relates to an optical switching device that incorporates a micromirror constituted as a micro movable element.

2. Description of the Related Art

In various industrial fields, minute devices manufactured by a micromachining technology are widely used. In the field of the optical communication for example, attention is drawn to minute micromirror devices with desired optical reflectivity. As another example, in the field of sensing techniques, gyro sensors are widely utilized for providing inertial sensors, car navigation systems and on-board airbags, or for performing robot posture control or prevention of blurring images due to hand movement in taking pictures.

In the optical communication in which optical signals are transmitted via optical fibers, optical switching devices are generally employed for switching the transmission route of the optical signal from a fiber to another. Characteristics required from the optical switching device for achieving excellent optical communication performance include large capacity, high speed, and high reliability in the switching operation. From such a viewpoint, optical switching devices including micromirror devices manufactured by the micromachining technique are very popular. This is mainly because the micromirror device eliminates the need to convert the optical signal into an electrical signal between the input-side optical line and the output-side optical line in the optical switching device, thereby facilitating achieving the required characteristics. The micromachining technique is disclosed in, for example, patent documents 1 to 3 listed below.

Patent document 1: JP-A-H10-190007
Patent document 2: JP-A-H10-270714
Patent document 3: JP-A-2000-31502

FIG. 17 depicts an outline of a popular optical switching device 60. The optical switching device 60 includes a pair of micromirror arrays 61, 62 and a plurality of micro lenses 63, 64, and is disposed between an input fiber array 71 and an output fiber array 72. The input fiber array 71 includes a number of input fibers 71a, and the micromirror array 61 includes a plurality of micromirror units 61a respectively corresponding to each input fibers 71a. Likewise, the output fiber array 72 includes a predetermined number of output fibers 72a, and the micromirror array 62 includes a plurality of micromirror units 62a respectively corresponding to each output fiber 72a. The micromirror units 61a, 62a respectively include a pivotably installed movable unit with a mirror surface for light reflection, and an actuator that generates a driving force for the pivotal motion of the movable unit, so as to control the orientation of the mirror surface of the movable unit. The micro lenses 63 are respectively disposed so as to face the facet of the input fibers 71a. Likewise, the micro lenses 64 are respectively disposed so as to face the facet of the output fibers 72a.

In an optical transmission, light L1 emitted from the input fiber 71a turns into mutually parallel light upon passing through the micro lens 63, and advances toward the micromirror array 61. The light L1 is reflected by the mirror surface of the micromirror unit 61a, and thus deflected toward the micromirror array 62. At this moment, the mirror surface of the micromirror unit 61a is oriented to a predetermined direction in advance, so as to make the light L1 incident upon a desired micromirror unit 62a. Then the light L1 is reflected by the mirror surface of the micromirror unit 62a, and thus deflected toward the output fiber array 72. At this moment, the mirror surface of the micromirror unit 62a is oriented to a predetermined direction in advance, so as to make the light L1 incident upon a desired output fiber 72a.

Thus in the optical switching device 60, the light L1 emitted from the input fiber 71a reaches the desired output fiber 72a through the deflection by the micromirror arrays 61, 62. This achieves one-to-one optical connection between the input fiber 71a and the output fiber 72a. Accordingly, appropriately adjusting the deflection angle of the micromirror unit 61a, 62a can switch the output fiber 72a which the light L1 is to reach.

FIG. 18 depicts an outline of another popular optical switching device 80. The optical switching device 80 includes a micromirror array 81, a fixed mirror 82 and a plurality of micro lenses 83, and is disposed so as to confront an input/output (hereinafter, I/O) fiber array 90. The I/O fiber array 90 includes a predetermined number of input fibers 91 and a predetermined number of output fibers 92, and the micromirror array 81 includes a plurality of micromirror units 81a respectively corresponding to each fiber 91, 92. The micromirror units 81a respectively include a pivotably installed movable unit with a mirror surface for light reflection, and an actuator that generates a driving force for the pivotal motion of the movable unit, so as to control the orientation of the mirror surface of the movable unit. The micro lenses 83 are respectively disposed so as to face the facet of the fibers 91, 92.

In an optical transmission, light L2 emitted from the input fibers 91a advances toward the micromirror array 81 through the micro lenses 83. The light L2 is reflected by the mirror surface of a corresponding first micromirror unit 81a, and thus deflected toward the fixed mirror 82, by which the light L2 is reflected and thus deflected toward a corresponding second micromirror unit 81a. At this moment, the mirror surface of the first micromirror unit 81a is oriented to a predetermined direction in advance, so as to make the light L2 incident upon a desired second micromirror unit 81a. Then the light L2 is reflected by the mirror surface of the second micromirror unit 81a, and thus deflected toward the I/O fiber array 90. At this moment, the mirror surface of the second micromirror unit 81a is oriented to a predetermined direction in advance, so as to make the light L2 incident upon a desired output fiber 92.

Thus in the optical switching device 80, the light L2 emitted from the input fiber 91 reaches the desired output fiber 92 through the deflection by the micromirror arrays 81 and the fixed mirror 82. Accordingly, appropriately adjusting the deflection angle of the first and the second micromirror unit 81a can switch the output fiber 92 which the light L2 is to reach.

In an existing optical switching device in general, the micromirror array is constituted of a plurality of micromirror units integrally formed in a single substrate (micromirror substrate) and fixed on an interconnect substrate, and then mounted on a package base via the interconnect substrate. The interconnect substrate is provided, on the same surface where the micromirror substrate is provided, with an interconnect pattern including a predetermined number of electrode pads (first electrode pad) located in a periphery of the substrate, and the interconnect pattern is electrically connect to the actuator of the respective micromirror units in the micromirror substrate. The package base includes a predetermined interconnect structure including a predetermined number of electrode pads (second electrode pad) formed on the same surface as the micromirror substrate or the interconnect substrate, and the interconnect structure and the interconnect pattern on the interconnect substrate are electrically connected by wire bonding between the first electrode pad and the second electrode pad. Such micromirror substrate, interconnect substrate and package base constitute a micromirror device to be implemented on a mother board or the like.

In the existing optical switching device or micromirror device thus structured, an increase in the number of fibers resultant from expansion of the optical communication network leads to an increase by the same extent in the number of micromirror units or movable units with the mirror surface to be included in a single micromirror substrate. The increase in the number of movable units in turn complicates the routing arrangement of the interconnect pattern on the interconnect substrate necessary for driving all the movable units, thereby increasing the dimensions of the interconnect substrate. Such complication of the routing arrangement of the interconnect pattern and the increase in dimensions of the interconnect substrate are unfavorable, especially from the viewpoint of cost efficiency in manufacturing the micromirror device, and hence the optical switching device. Further, the more movable units are introduced, the more first electrode pads have to be provided in the interconnect substrate and the more second electrode pads in the package base, which naturally results in an increase by the same extent in the wire bonding steps to connect the first electrode pad and the second electrode pad. The increase in the wire bonding steps is undesirable in improving the yield of the production of the micromirror device or the optical switching device. Thus, the conventional technique still has a room for improvement, to carry out efficient production of the micromirror device or the optical switching device.

SUMMARY OF THE INVENTION

The present invention has been proposed under the foregoing situation, and therefore it is an object for the present invention to provide a micro movable element and an optical switching device that can be efficiently manufactured.

A first aspect of the present invention provides a micro movable element. The micro movable element comprises a micro movable substrate provided with a micro movable unit including a frame, a movable portion that is pivotable with at least local vibration or without vibration, a torsion connector that connects the frame and the movable portion, and an actuator that generates a driving force for the pivotal motion. The movable element of the present invention also comprises a package base including an internal interconnect structure and an electroconductive connector provided between the micro movable unit on the micro movable substrate and the package base for electrically connecting the actuator and the internal interconnect structure. The micro movable element may be employed as a micro pivotal device that enables the movable unit to functionally perform a pivotal movement, for example in a micromirror device, or a micro detector that detects a displacement of the movable unit, for example in a gyro sensor.

In the micro movable element according to the first aspect, an interconnect substrate is not interposed between the micro movable substrate and the package base. The micro movable substrate is fixed to the package base for example via the electroconductive connector, interposed between the micro movable unit on the micro movable substrate and the package base. The electroconductive connector, which serves to electrically connect the actuator in the micro movable unit on the micro movable substrate and the internal interconnect structure in the package base, may be for example a conductive bump connected to the electrode pad (first electrode pad) on the surface of the micro movable substrate in electrical connection to the actuator, and to the electrode pad (second electrode pad) on the surface of the package base in electrical connection to the internal interconnect structure. Accordingly, the manufacturing process of the present micro movable element can exclude routing the interconnect pattern on the surface of the interconnect substrate, and the wire bonding process for achieving electrical connection between the first electrode pad and the second electrode pad. Therefore, the present micro movable element is advantageous for improving the production efficiency.

A second aspect of the present invention provides a micro movable element. The micro movable element comprises a micro movable substrate provided with a plurality of micro movable units integrally formed thereon, respectively including a frame, a movable unit that is pivotable with at least local vibration or without vibration, a torsion connector that connects the frame and the movable unit, and an actuator that generates a driving force for the pivotal motion; a package base including an internal interconnect structure; and a plurality of electroconductive connectors respectively provided between one of the micro movable units on the micro movable substrate and the package base, so as to electrically connect the actuator of the one of the micro movable units and the internal interconnect structure. The micro movable element may be employed as a micro pivotal device that enables the movable units to functionally perform a pivotal movement, for example in a micromirror device, or a micro detector that detects a displacement of the movable units, for example in a gyro sensor.

In the micro movable element according to the second aspect, an interconnect substrate is not interposed between the micro movable substrate and the package base. The micro movable substrate is fixed to the package base for example via the plurality of electroconductive connectors, interposed between the micro movable substrate and the package base. Each electroconductive connector, interposed between one of the micro movable units on the micro movable substrate and the package base, so as to electrically connect the actuator in the one of the micro movable units on the micro movable substrate and the internal interconnect structure in the package base, may be for example a conductive bump connected to the electrode pad (first electrode pad) on the surface of the micro movable substrate in electrical connection to the actuator, and to the electrode pad (second electrode pad) on the surface of the package base in electrical connection to the internal interconnect structure. Accordingly, the manufacturing process of the present micro movable element can exclude routing the interconnect pattern on the surface of the interconnect substrate and the complicated interconnect pattern on the surface of the package base, as well as the wire bonding process on many points for achieving electrical connection between the first electrode pad and the second electrode pad. Therefore, the present micro movable element is advantageous for improving the production efficiency. The improving effect of the production efficiency becomes more prominent with an increase in the number of the micro movable units to be formed on the micro movable substrate.

A third aspect of the present invention provides a micro movable element. The micro movable element comprises a plurality of micro movable substrates respectively provided with a plurality of micro movable units integrally formed thereon, respectively including a frame, a movable unit that is pivotable with at least local vibration or without vibration, a torsion connector that connects the frame and the movable unit, and an actuator that generates a driving force for the pivotal motion; a package base including an internal interconnect structure; and a plurality of electroconductive connectors respectively provided between one of the micro movable units on the micro movable substrate and the package base, so as to electrically connect the actuator of the one of the micro movable units and the internal interconnect structure. The micro movable element may be employed as a micro pivotal device that enables the movable units to functionally perform a pivotal movement, for example in a micromirror device, or a micro detector that detects a displacement of the movable units, for example in a gyro sensor.

In the micro movable element according to the second aspect, an interconnect substrate is not interposed between the micro movable substrate and the package base. Each micro movable substrate is fixed to the package base for example via the plurality of electroconductive connectors, interposed between the micro movable substrate and the package base. Each electroconductive connector, interposed between one of the micro movable units on the micro movable substrate and the package base, so as to electrically connect the actuator in the one of the micro movable units on the micro movable substrate and the internal interconnect structure in the package base, may be for example a conductive bump connected to the electrode pad (first electrode pad) on the surface of the micro movable substrate in electrical connection to the actuator, and to the electrode pad (second electrode pad) on the surface of the package base in electrical connection to the internal interconnect structure. Accordingly, the manufacturing process of the present micro movable element can exclude routing the interconnect pattern on the surface of the interconnect substrate and the complicated interconnect pattern on the surface of the package base, as well as the wire bonding process on many points for achieving electrical connection between the first electrode pad and the second electrode pad. Therefore, the present micro movable element is advantageous for improving the production efficiency. The improving effect of the production efficiency becomes more prominent with an increase in the number of the micro movable units to be formed on the micro movable substrate.

In the first to the third aspects of the present invention, it is preferable that the package base is predominantly constituted of a ceramic. Employing ceramics is appropriate in securing rigidity and insulation performance, which are required from the package base.

In the first to the third aspects of the present invention, it is preferable that a surface of the package base to which the micro movable substrate is fixed has a flatness of 50 μm or less. Such structure allows stably mounting the micro movable substrate on the package base.

In the first to the third aspects of the present invention, it is preferable that fluctuation in height among the plurality of electroconductive connectors is not greater than 10 μm. Such structure allows stably mounting the micro movable substrate on the package base.

In the first to the third aspects of the present invention, it is preferable that the electroconductive connector fixedly sustains the micro movable substrate. For example, a single electroconductive connector constituted of at least one conductive bump can fix the micro movable substrate to the package base by itself.

In the first to the third aspects of the present invention, the electroconductive connector may preferably include a plurality of conductive paths. In this case, the conductive paths may be constituted of a plurality of stacked conductive bumps. Such structure is advantageous in preventing imperfect electrical connection between the internal interconnect structure in the package base and the actuator via the electroconductive connector.

The first to the third aspects of the present invention may preferably further comprise a cap structure that seals one or a plurality of the micro movable substrates in cooperation with the package base, and the cap structure may include an annular wall joined to the package base so as to surround a region where one or a plurality of the micro movable substrates is provided, and a lid disposed so as to face the one or the plurality of the micro movable substrates. Such structure is advantageous in air-tightly sealing the micro movable substrate or the micro movable unit.

Preferably, the lid may include a transparent portion that can transmit light. The transparent portion may preferably has transmittance of 90% or higher. Preferably, the transparent portion may be provided with an optical band-pass filter on a surface thereof. Such structure is appropriate when utilizing the micro movable element as a micromirror device.

Preferably, the annular wall may be constituted of a metal, or provided with a metal layer on a surface thereof. Such annular wall may be advantageous in joining to another constituent.

Preferably, the first to the third aspects of the present invention may further comprise a connector unit for external connection, electrically connected to the package base. The connector unit may be provided on the same side of the package base as the micro movable substrate, or on the opposite side thereof. Such structure is advantageous in assuring the electrical connection between the micro movable element and a mother board or the like on which the micro movable element is to be mounted.

In the second and the third aspect of the present invention, the plurality of movable units on a single micro movable substrate may preferably be arranged in an m rows by n columns at regular intervals in the horizontal direction and/or in the vertical direction, where m is an integer≧1 and n is an integer≧2. It is preferable that the plurality of movable units on a single micro movable substrate is orderly aligned in such a manner.

In the third aspect of the present invention, the plurality of micro movable substrates may preferably be arranged in p rows by q columns, where p is an integer≧1 and q is an integer≧2. In this case, preferably, the plurality of micro movable substrates is spaced from one another, such that the interval between closest two movable units respectively located on two adjacent micro movable substrates is integer times as wide as the interval between the movable units on one of the micro movable substrates, along the spacing direction of the adjacent micro movable substrates. It is preferable that the plurality of micro movable substrates is orderly aligned in such a manner.

A fourth aspect of the present invention provides an optical switching device. The optical switching device comprises a plurality of the micro movable elements according to any of the first to the third aspects. As stated earlier, the micro movable elements according to the first to the third aspects are advantageous in improving the production efficiency. Accordingly, the optical switching device is also advantageous in improving the production efficiency.

BRIEF DESCRIPTION OF THE DRAWINGS

FIG. 6 is a cross-sectional view taken along the line VI-VI of FIG. 4;

FIG. 7 is a cross-sectional view taken along the line VII-VII of FIG. 4;

DETAILED DESCRIPTION OF THE PREFERRED EMBODIMENTS

Figure 1:
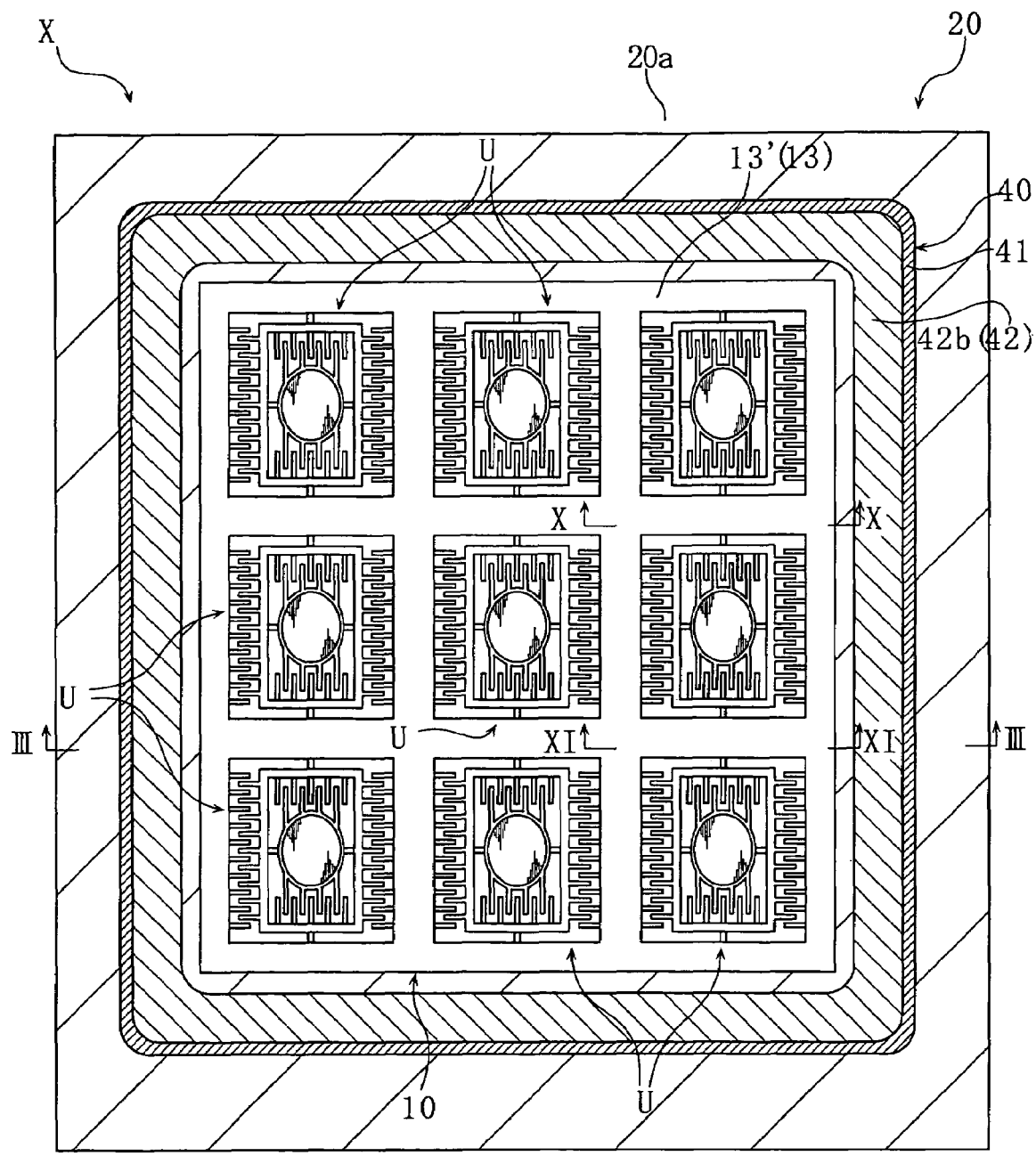
FIG. 1 is a plan view showing a micromirror device according to a first embodiment of the present invention.
Figure 2:
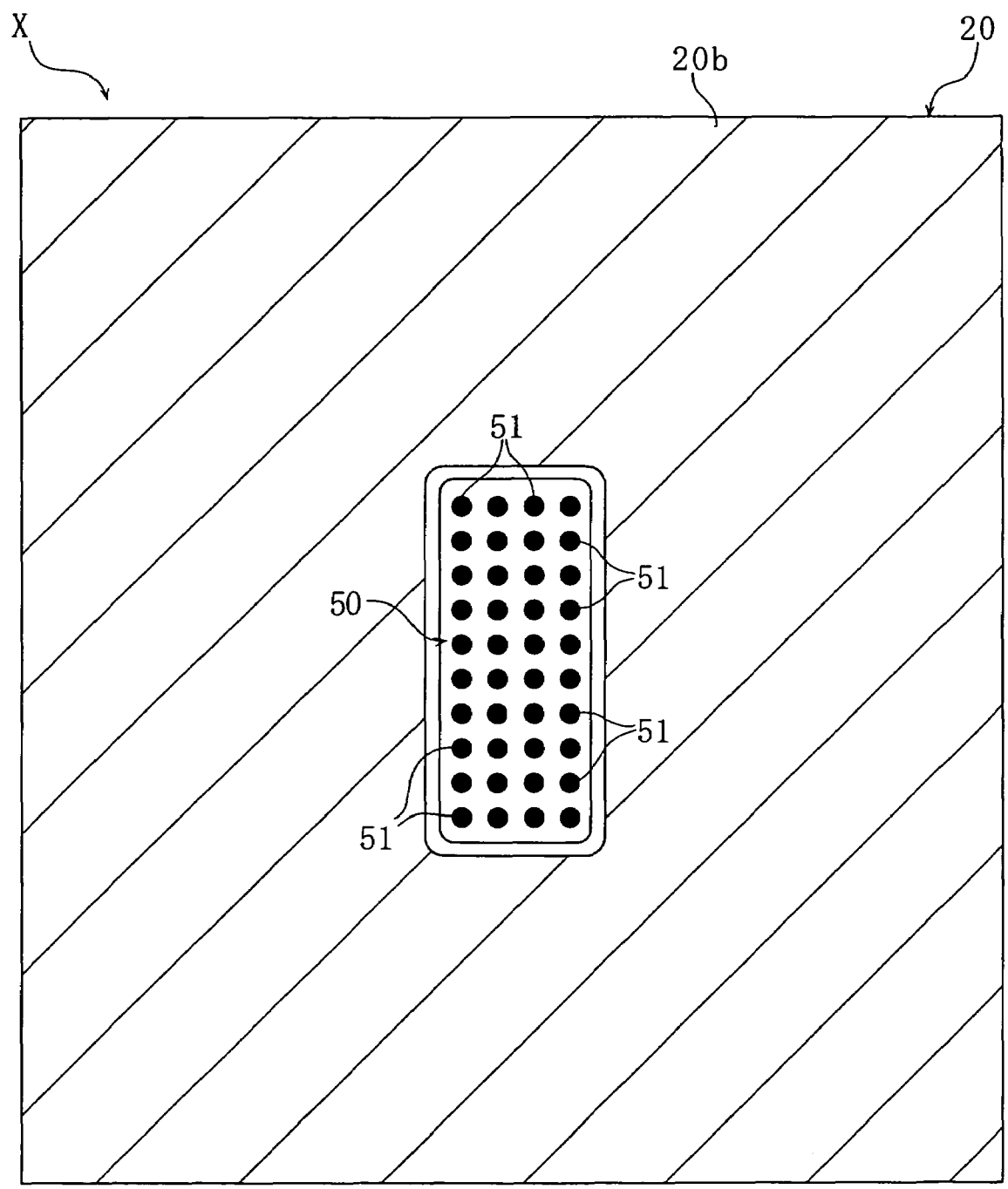
FIG. 2 is a plan view showing the opposite side of the micromirror device according to the first embodiment.
Figure 3:
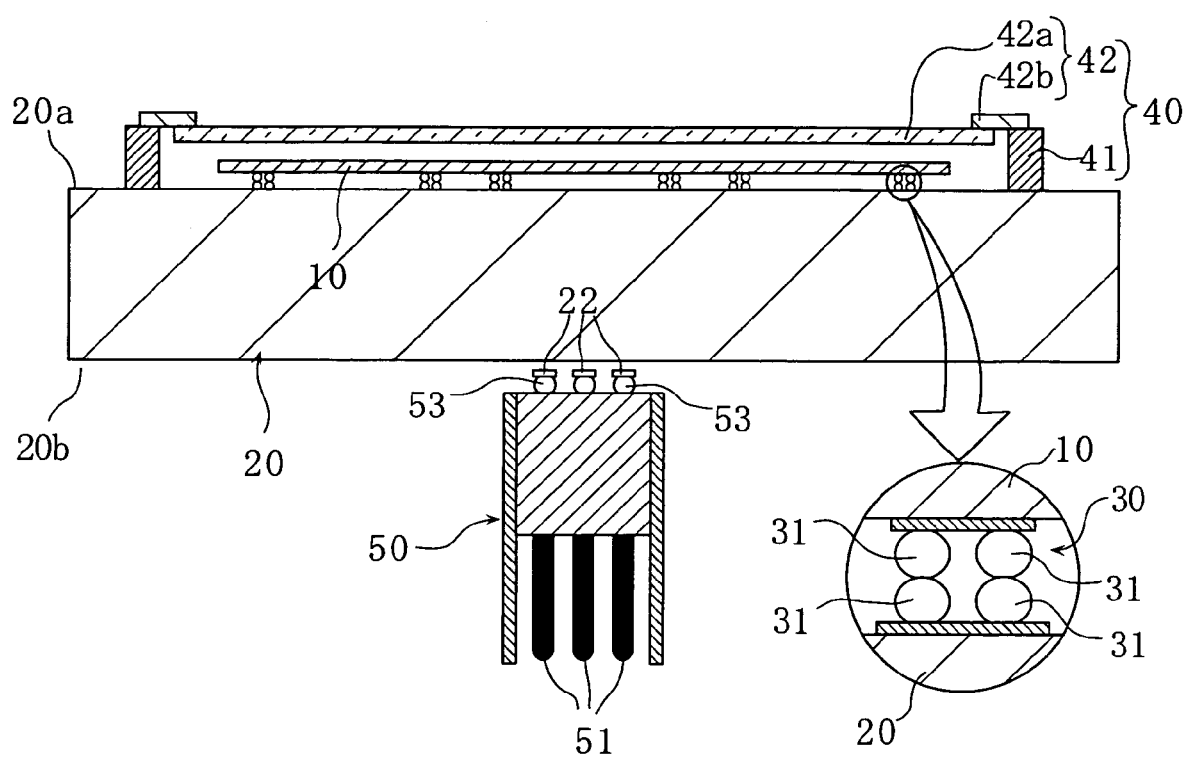
FIG. 3 is a cross-sectional view taken along the line III-III of FIG. 1.

FIGS. 1 to 3 depict a micromirror device X according to the present invention. FIGS. 1 and 2 are plan views showing the micromirror device X, viewed from above and below respectively. FIG. 3 is a cross-sectional view taken along the line III-III of FIG. 1. The micromirror device X includes a micromirror substrate 10, a package base 20, a plurality of electroconductive connectors 30 interposed between the micromirror substrate and the package base, a cap unit 40, and a connector 50.

Figure 4:
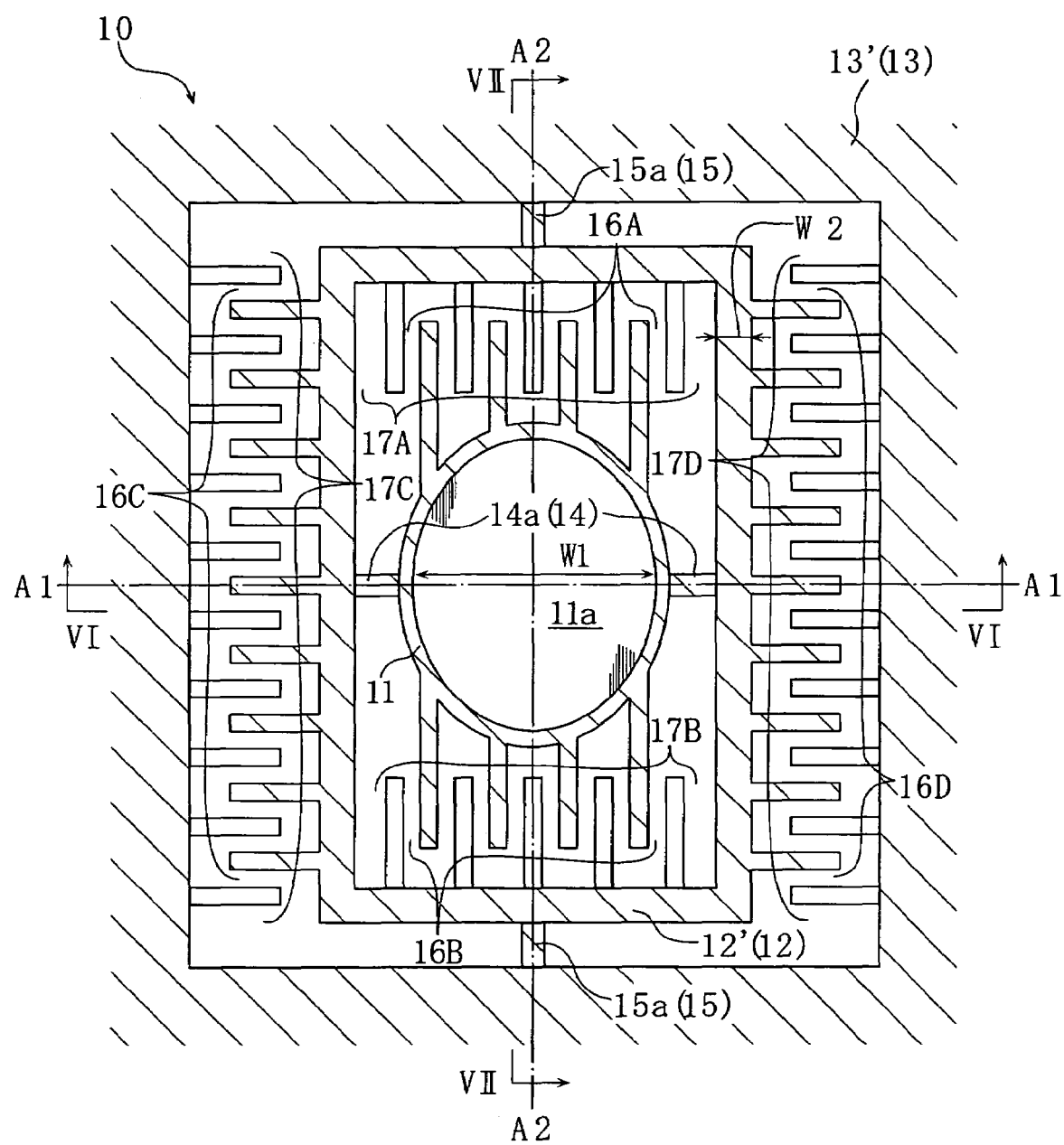
FIG. 4 is an enlarged fragmentary plan view showing the micromirror substrate included in FIG. 1.

The micromirror substrate 10 is manufactured by processing a material substrate (an SOI wafer) by bulk micromachining technique, a type of MEMS technology. Specifically, the bulk micromachining technique includes dry etching (such as Deep Reactive Ion Etching), wet etching, thin-film deposition, photolithography, etc. The substrate 10 is provided with nine pieces of micromirror units U integrally formed thereon, each unit having the same design and dimensions. The material substrate, which has a stacked structure, includes a first silicon layer (for example 100 μm in thickness), a second silicon layer (for example 100 μm in thickness), and an insulating layer (for example 1 μm in thickness) provided between the first and the second silicon layers. Each of the silicon layers is provided with appropriate conductivity by impurity doping. As shown in FIGS. 1 and 4 to 7, each of the micromirror units U includes a mirror base 11, an inner frame 12, an outer frame 13, a pair of torsion connectors 14, a pair of torsion connectors 15, and comb electrodes 16A-16D and 17A-17D. For the sake of explicitness of the drawings, the hatched portion in FIG. 4 represents a portion originating from the first silicon layer projecting upward to a region higher than the insulating layer, and the hatched portion in FIG. 5 designates a portion originating from the second silicon layer projecting downward to a region lower than the insulating layer, and a portion of the outer frame 13 constituted of a portion of the first silicon layer.

The mirror base 11, which originates from the first silicon layer, is provided with a mirror surface 11a for reflecting light, on its surface. The mirror surface 11a is of a stacked structure including, for example, a Cr layer deposited on the first silicon layer and an Au layer formed on the Cr layer. The dimension W1 of the mirror base 11 shown in FIG. 4 is, for example, 100 to 700 μm. The mirror base 11 thus configured constitutes the movable unit according to the present invention, with the inner frame 12 and the torsion connectors 14 (to be described below).

The inner frame 12 includes, as seen from FIGS. 4 to 7, a main portion 12' originating from the first silicon layer, and island portions 12A, 12B originating from the second silicon layer, and is so shaped as to surround the mirror base 11. Between the main portion 12' and the island portions 12A, 12B the insulating layer is interposed, and hence the main portion 12' and the island portions 12A, 12B are electrically isolated. The width W2 of the inner frame 12 shown in FIG. 4 is, for example, 20 to 100 μm.

Figure 5:
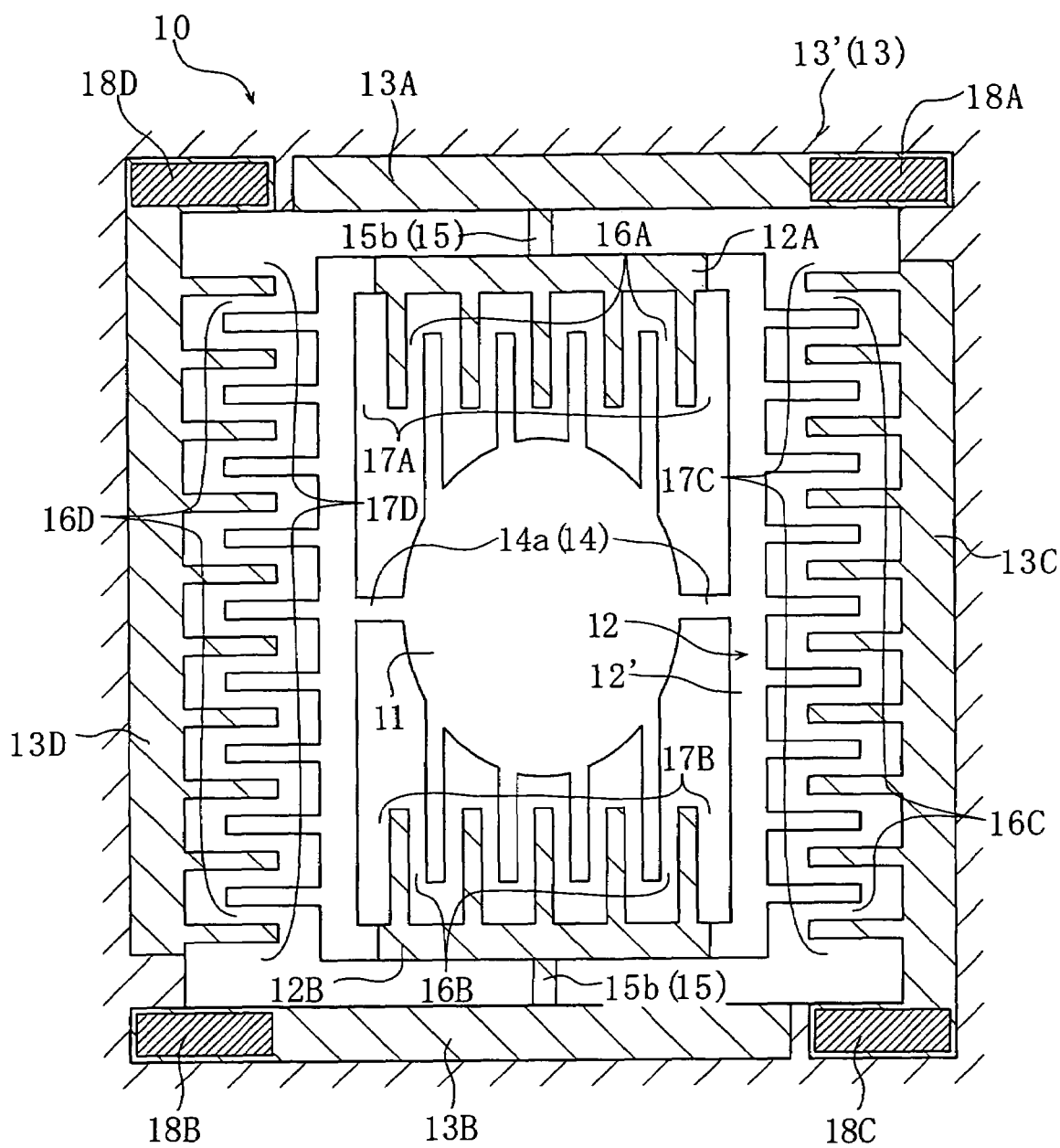
FIG. 5 is an enlarged fragmentary plan view showing the opposite side of the micromirror substrate included in FIG. 1.

The outer frame 13 includes, as seen from FIGS. 4 to 7, a main portion 13' originating from the first silicon layer, and island portions 13A, 13B, 13C, 13D originating from the second silicon layer, and is so shaped as to surround the inner frame 12. Between the main portion 13' and the island portions 13A to 13D the insulating layer is interposed, and hence the main portion 13' and the island portions 13A to 13D are electrically isolated. The island portions 13A to 13D are isolated from one another, both physically and electrically. As shown in FIG. 5, the island portions 13A to 13D are respectively provided thereon with electrode pads 18A to 18D. Also as shown in FIG. 1, the main portions 13' (portions originating from the first silicon layer) of the outer frame 13 around the nine micromirror units U are continuously formed.

The pair of torsion connectors 14 respectively includes a torsion bar 14a. Each torsion bar 14a, which originates from the first silicon layer, is connected to for example the mirror base 11 and the main portion 12' of the inner frame 12 thus to serve as a link therebetween, as shown in FIG. 6. Via such torsion bar 14a, the mirror base 11 and the main portion 12' are electrically connected. In this embodiment, the torsion bar 14a is thinner than the mirror base 11 and the main portion 12', in a thicknesswise direction H of the device. The pair of torsion connectors 14 or the pair of torsion bars 14a thus configured defines a central axis A1 for relative pivotal motion of the mirror base 11 with respect to the inner frame 12. The pivotal central axis A1 preferably passes through the center of gravity or the vicinity thereof of the mirror base 11.

The pair of torsion connectors 15 respectively includes two torsion bars 15a, 15b. Each torsion bar 15a, which originates from the first silicon layer, is connected to for example the main portion 12' of the inner frame 12 and the main portion 13' of the outer frame 13 thus to serve as a link therebetween, as shown in FIG. 7. Via such torsion bar 15a, the main portion 12' and the main portion 13' are electrically connected. In this embodiment, the torsion bar 15a is thinner than the main portions 12', 13', in a thicknesswise direction H of the device. Each torsion bar 15b originates from the second silicon layer. The torsion bar 15b on one side is connected to for example the island portion 12A of the inner frame 12 and the island portion 13A of the outer frame 13 thus to serve as a link therebetween, as shown in FIG. 7. Via such torsion bar 15b, the island portion 12A and the island portion 13A are electrically connected. In this embodiment, the torsion bar 15b is thinner than the island portion 12A and the island portion 13A, in a thicknesswise direction H of the device. The torsion bar 15b on the other side is connected to for example the island portion 12B of the inner frame 12 and the island portion 13B of the outer frame 13 thus to serve as a link therebetween, as shown in FIG. 7. Via such torsion bar 15b, the island portion 12B and the island portion 13B are electrically connected. In this embodiment, the torsion bar 15b is thinner than the island portion 12B and the island portion 13B, in a thicknesswise direction H of the device. The pair of torsion connectors 15 thus configured define a central axis A2 for relative pivotal motion of the movable unit (mirror base 11, inner frame 12, pair of torsion connectors 14) with respect to the outer frame 13. The pivotal central axis A2 preferably passes through the center of gravity or the vicinity thereof of the movable unit.

The comb electrode 16A includes a plurality of electrode teeth originating from the first silicon layer. The electrode teeth constituting the comb electrode 16A respectively project from the mirror base 11 in parallel to one another, as shown in FIGS. 4 and 5. The comb electrode 16B includes a plurality of electrode teeth originating from the first silicon layer. The electrode teeth constituting the comb electrode 16B respectively project in parallel to one another, from the opposite side of the mirror base 11 to the comb electrode 16A, as shown in FIGS. 4 and 5. It is preferable that an extension of the electrode teeth of the comb electrodes 16A, 16B is orthogonal to an extension of the central axis A1. The comb electrodes 16A, 16B thus configured are electrically connected via the mirror base 11.

The comb electrode 16C includes a plurality of electrode teeth originating from the first silicon layer. The electrode teeth constituting the comb electrode 16C respectively project from the main portion 12' of the inner frame 12 in parallel to one another, as shown in FIGS. 4 and 5. The comb electrode 16D includes a plurality of electrode teeth originating from the first silicon layer. The electrode teeth constituting the comb electrode 16D respectively project in parallel to one another, from the opposite side of the main portion 12' to the comb electrode 16C, as shown in FIGS. 4 and 5. It is preferable that an extension of the electrode teeth of the comb electrodes 16C, 16D is orthogonal to an extension of the central axis A2. The comb electrodes 16C, 16D thus configured are electrically connected via the main portion 12'.

The comb electrode 17A, which serves to generate an electrostatic attraction (driving force) in cooperation with the comb electrode 16A, includes a plurality of electrode teeth originating from the second silicon layer. The electrode teeth constituting the comb electrode 17A respectively project from the island portion 12A of the inner frame 12, in parallel to one another and to the electrode teeth of the comb electrode 16A. The pair of comb electrodes 16A, 17A constitutes an actuator in the micromirror unit U.

The comb electrode 17B, which serves to generate an electrostatic attraction (driving force) in cooperation with the comb electrode 16B, includes a plurality of electrode teeth originating from the second silicon layer. The electrode teeth constituting the comb electrode 17B respectively project from the island portion 12B of the inner frame 12, in parallel to one another and to the electrode teeth of the comb electrode 16B. The pair of comb electrodes 16B, 17B constitutes an actuator in the micromirror unit U.

The comb electrode 17C, which serves to generate an electrostatic attraction (driving force) in cooperation with the comb electrode 16C, includes a plurality of electrode teeth originating from the second silicon layer. The electrode teeth constituting the comb electrode 17C respectively project from the island portion 13C of the outer frame 13, in parallel to one another and to the electrode teeth of the comb electrode 16C. The pair of comb electrodes 16C, 17C constitutes an actuator in the micromirror unit U.

The comb electrode 17D, which serves to generate an electrostatic attraction (driving force) in cooperation with the comb-electrode 16D, includes a plurality of electrode teeth originating from the second silicon layer. The electrode teeth constituting the comb electrode 17C respectively project from the island portion 13D of the outer frame 13, in parallel to one another and to the electrode teeth of the comb electrode 16D. The pair of comb electrodes 16D, 17D constitutes an actuator in the micromirror unit U.

As described above, the micromirror unit U is configured as a biaxial pivotal device in the micromirror substrate 10, and includes four actuators in total. In this embodiment, nine micromirror units U are arranged in a 3×3 matrix, that is, in a grid-like manner with three rows (a row is a horizontal array) and three columns (a column is a vertical array) spaced at regular intervals both in the horizontal direction (the "row-extending direction") and in the vertical direction (the "column-extending direction").

Figure 8:
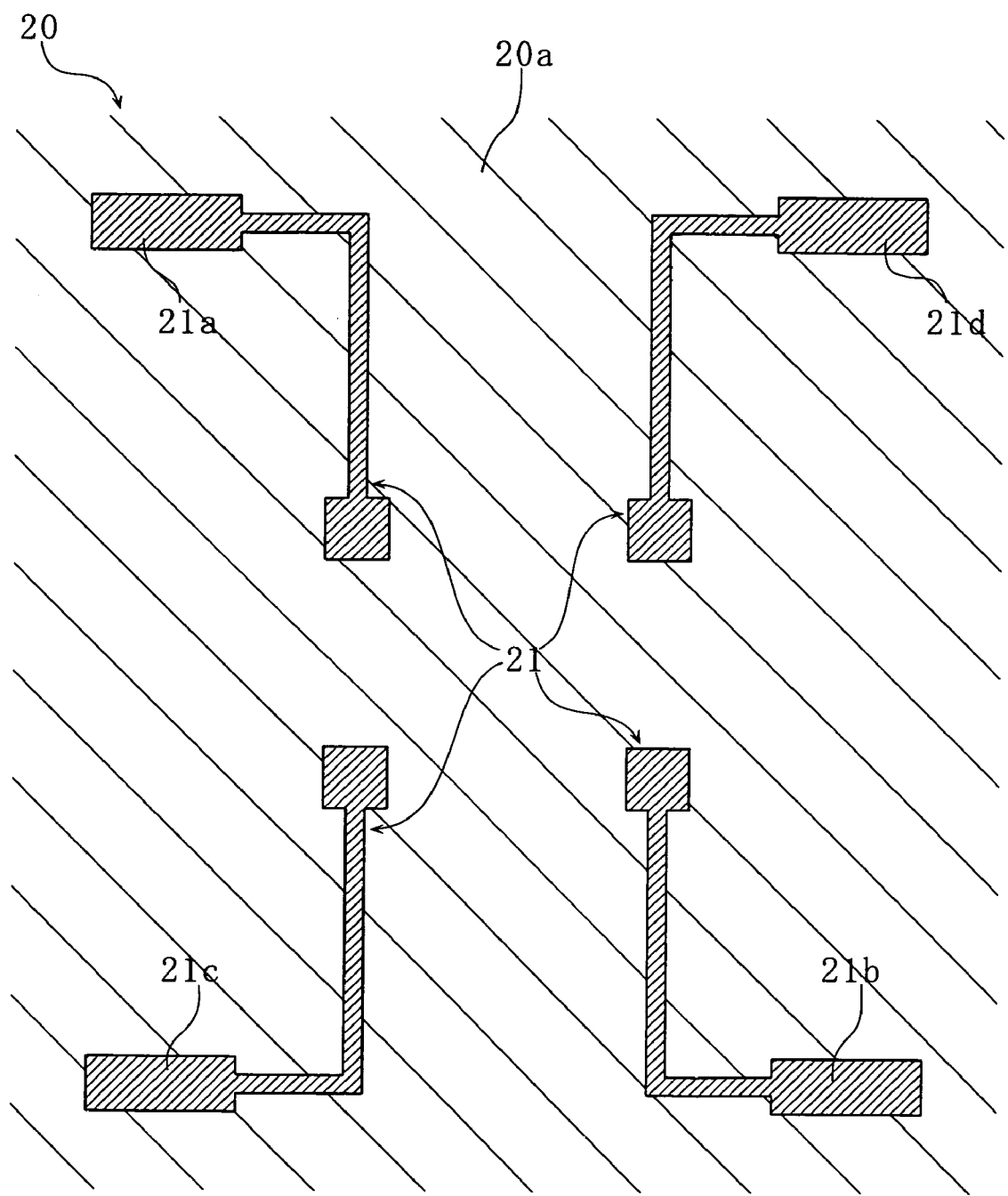
FIG. 8 is an enlarged fragmentary plan view showing the package base included in FIG. 1.
Figure 9:
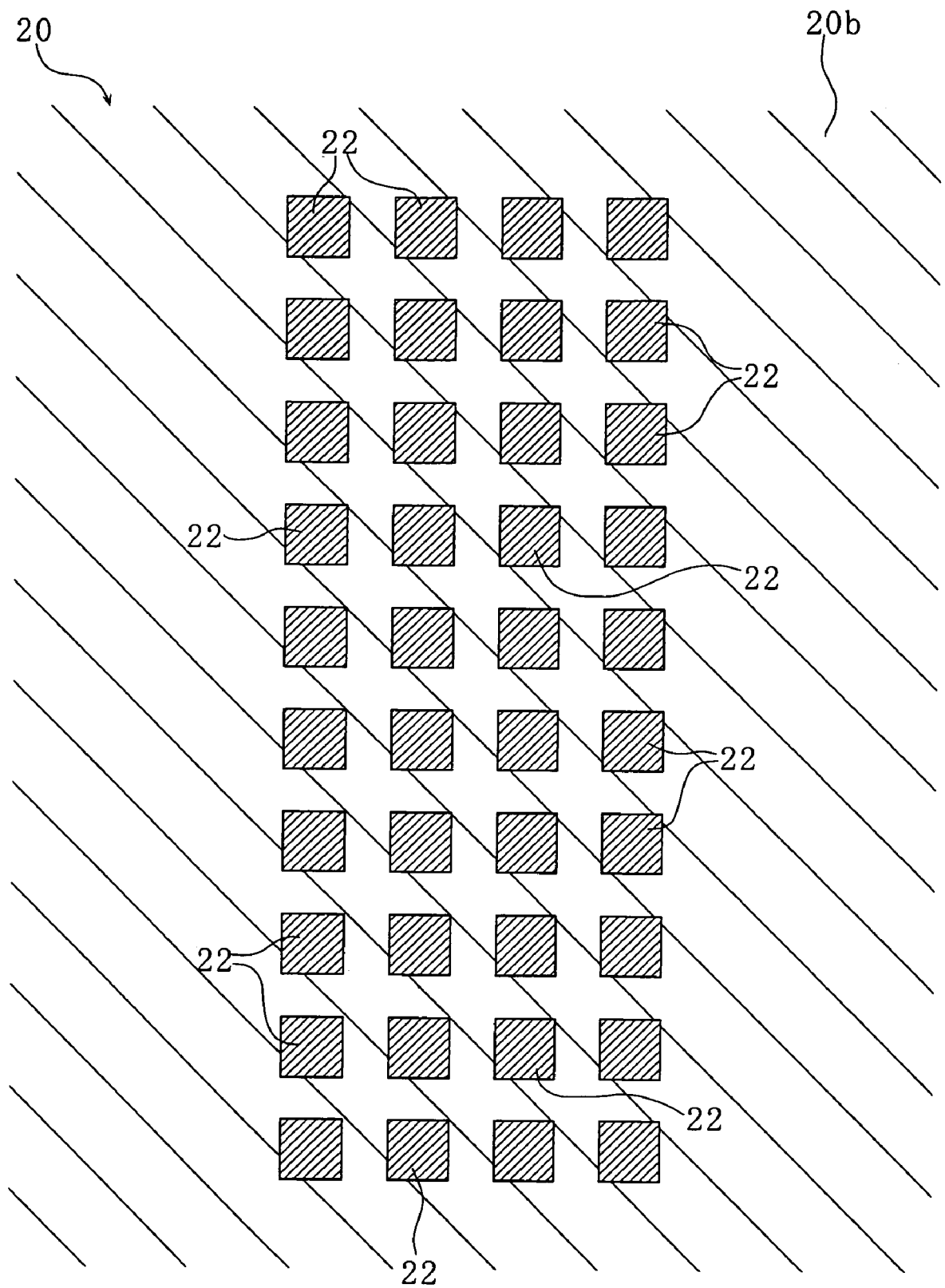
FIG. 9 is an enlarged fragmentary plan view showing the opposite side of the package base included in FIG. 1.

The package base 20 includes, as shown in FIG. 3 for example, a first surface 20a and a second surface 20b, and encloses therein a multilayer interconnect structure (not shown). On the first surface 20a, an interconnect pattern 21 as shown in FIG. 8 is provided for each of the micromirror units U. The interconnect pattern 21 includes electrode-pads 21a, 21b, 21c, 21d, and is electrically connected to the internal multilayer interconnect structure. The electrode pads 21a to 21d are respectively disposed so as to face the electrode pads 18A to 18D in each micromirror unit U. On the first surface 20a, four electrode pads (not shown) are also provided for ground connection. The electrode pads for ground connection, which constitute a part of the electrical path for connecting the comb electrodes 16A, 16B on the micromirror substrate 10 to the ground, is electrically connected to the internal multilayer interconnect structure in the package base 20, as well as to the main portion 13' of the outer frame 13 on the micromirror substrate 10, via a predetermined interconnect (not shown). Such predetermined interconnect is preferably included in the micromirror substrate 10. In a central portion of the second surface 20b, totally forty pieces of electrode pads 22 are provided in a matrix array, as shown in FIG. 9 (FIGS. 8 and 9 are drawn in different scales). The electrode pads 22 are electrically connected to the internal multilayer interconnect structure. The totally thirty-six electrode pads 21a to 21d and the four electrode pads for ground connection on the first surface 20a, and the forty electrode pads 22 on the second surface 20b are electrically connected on a one-to-one basis via the internal multilayer interconnect structure. The package base 20 has a thickness of 1 to 2 mm, for example.

To manufacture the foregoing package base 20, firstly the predetermined interconnect pattern and a conductive plug are formed on a plurality of sheets of ceramic substrates (green sheets) A metal material such as Au or Al is deposited on the surface of the respective ceramic substrates, after which a pattern is delineated on the metal material to thereby form the predetermined interconnect pattern. A through hole is formed at a predetermined position on each ceramic substrate, and then the through hole is filled with a conductive paste, so that the predetermined conductive plug is formed. Then the ceramic substrates on which the interconnect pattern and the conductive plug have been thus formed are stacked and sintered. This is followed by a polishing process of the surface of the stacked structure, on which the micromirror substrate 10 is to be mounted (first surface 20a). The polishing process preferably achieves the surface flatness of 50 µm or lower. Thereafter, a metal material such as Au or Al is deposited on the first surface 20a, after which a pattern is delineated on the metal material, to thereby form the interconnect pattern 21 and the electrode pads for ground connection for each micromirror unit U. Finally, a metal material such as Au or Al is deposited on the second surface 20b, after which a pattern is delineated on the metal material, to thereby form the forty electrode pads 22. That is an example of the manufacturing method of the package base 20 according to this embodiment.

Figure 10:
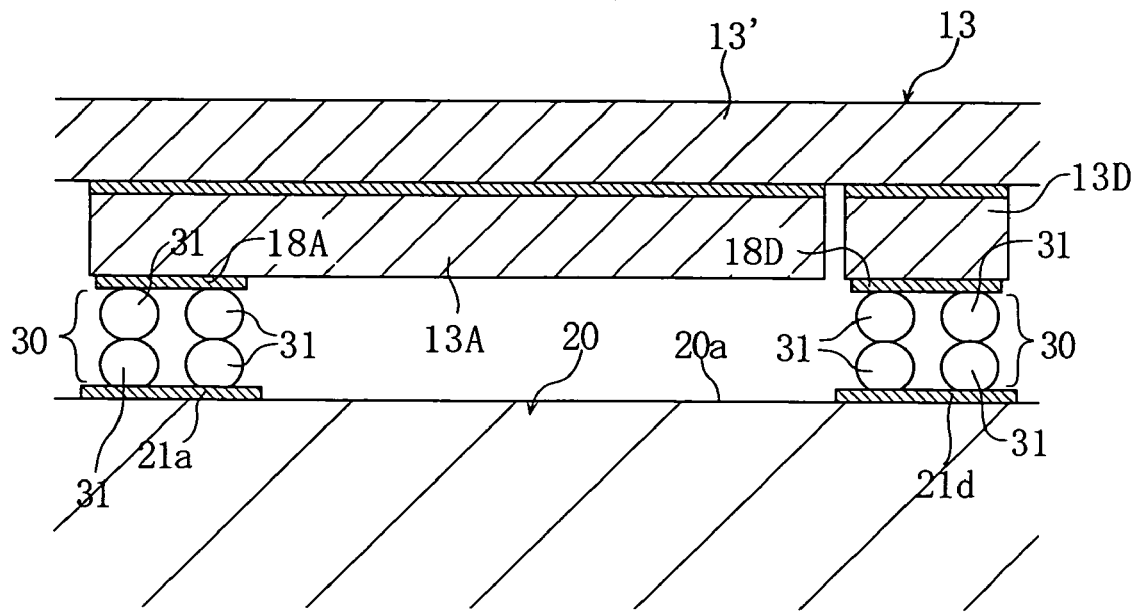
FIG. 10 is an enlarged fragmentary cross-sectional view taken along the line X-X of FIG. 1.
Figure 11:
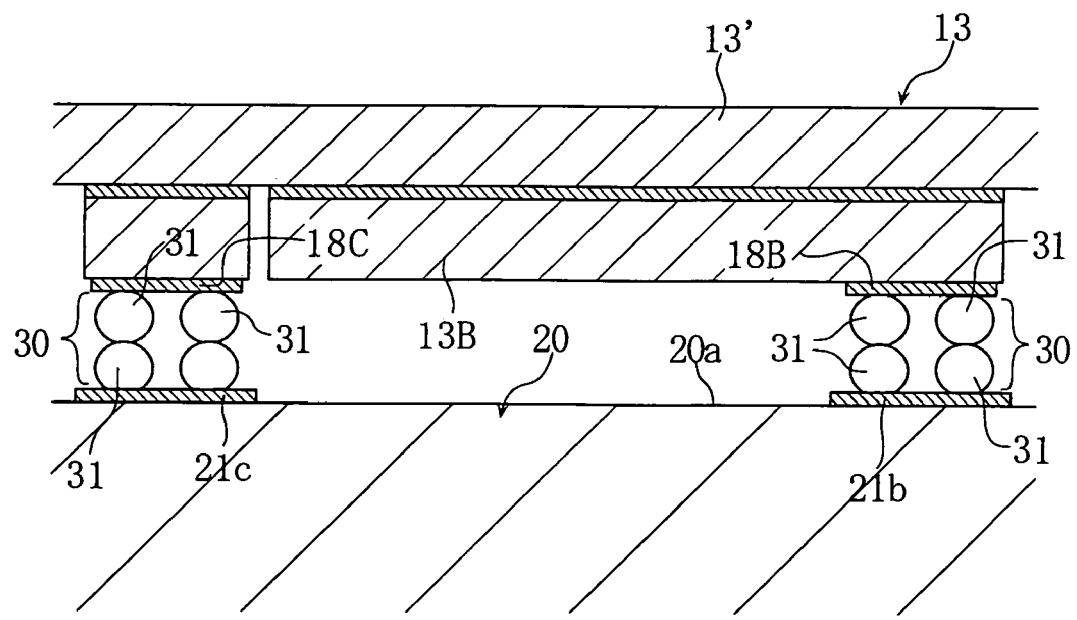
FIG. 11 is an enlarged fragmentary cross-sectional view taken along the line XI-XI of FIG. 1.

The electroconductive connectors 30 are interposed between the micromirror substrate 10 and the package base 20, for example as shown in FIG. 3, so as to serve to electrically connect each actuator (constituted of a pair of opposing comb electrodes) formed on the micromirror substrate 10 in the micromirror unit U and the interconnect structure on the package base 20. The electroconductive connectors 30 also serve to fix the micromirror substrate 10 to the package base 20, serving at the same time as a spacer for creating a gap between the micromirror substrate 10 and the package base 20. As shown in FIGS. 10 and 11, one electroconductive connector 30 is located between the electrode pads 18A and 21a, between the electrode pads 18B and 21b, between the electrode pads 18C and 21c, and between the electrode pads 18D and 21d, respectively. For simplifying the drawing, the cap unit 40 is omitted from FIGS. 10 and 11. In this embodiment, the respective electroconductive connectors 30 have two conductive paths, each of which includes two levels of ball bumps 31.

The cap unit 40 includes, as shown in FIGS. 1 and 3, a ring 41 and a lid 42, so as to air-tightly seal the micromirror substrate 10 in cooperation with the package base 20. The ring 41 is joined to the package base 20 so as to surround a region where the micromirror substrate 10 is located, and is either constituted of a metal or coated with a metal layer. The lid 42 includes a transparent portion for transmitting light to and from the micromirror substrate 10, and a metal frame 42b joined to a periphery of the transparent portion 42a. The transparent portion 42a may be constituted of a glass, sapphire, quartz, or a plastic. It is preferable that the transparent portion 42a is provided with an optical band-pass filter on the surface thereof, so as to selectively transmit the light of a predetermined frequency band. Also, it is preferable that the transparent portion 42a has transmittance of 90% or higher, with respect to the light of the predetermined frequency band.

The connector 50, which serves to provide an external connection terminal to the micromirror device X, includes for example totally forty pins 51 working as the external connection terminals, as shown in FIG. 2. On a surface of the connector 50 facing the package base 20, totally forty electrode pads (not shown) are provided, such that each of these electrode pads and each of the forty electrode pads 22 on the package base 20 shown in FIG. 9 are bonded via a solder bump 53, as shown in FIG. 3. While the connector 50 is located on the opposite side of the package base 20 to the micromirror substrate 10 according to this embodiment, the connector 50 may be located on the same side of the package base 20 as the micromirror substrate 10, according to the present invention. In this case, the plurality of electrode pads 22, electrically connected to the plurality of electrode pads 21a to 21d and the plurality of electrode pads for ground connection via the internal multilayer interconnect structure, is to be located on the same side of the package base 20 as the micromirror substrate 10. Alternatively, a different type of external connection terminal may be provided in place of the connector 50, according to the present invention.

In the micromirror device X thus structured, connecting to the ground the main portion 13' (originating from the first silicon layer) of the outer frame 13 continuously provided around the nine micromirror units U results in the ground connection of the comb electrodes 16A to 16D in the respective micromirror units U, via the two torsion bars 15a, the main portion 12' of the inner frame 12, the two torsion bars 14a (pair of torsion connectors 14), and the mirror base 11.

Under such ground connection status, granting a desired potential to the comb electrode 17A so as to generate an electrostatic attraction between the comb electrodes 16A and 17A, or granting a desired potential to the comb electrode 17B so as to generate an electrostatic attraction between the comb electrodes 16B and 17B in each micromirror unit U, rotationally displaces the mirror base 11 around the pivotal central axis A2. The mirror base 11 is rotationally displaced by such an angle where the electrostatic attraction generated and a total sum of the torsional resistance of the pair of torsion connectors 14 (two torsion bars 14a) are equilibrated. The amount of the rotational displacement can be controlled by adjusting the potential granted to the comb electrode 17A or 17B. The potential can be granted to the comb electrode 17A in a desired micromirror unit U, via the predetermined pin 51 of the connector 50, one of the electrode pads 22 on the package base 20, the internal multilayer interconnect structure and the electrode pad 21a, the electroconductive connector 30 connected thereto, and then via the electrode pad 18A, the island portion 13A, the torsion bar 15b connected thereto and the island portion 12A in the micromirror unit U. To the comb electrode 17B in the desired micromirror unit U, the potential can be granted via the predetermined pin 51 of the connector 50, one of the electrode pads 22 on the package base 20, the internal multilayer interconnect structure and the electrode pad 21b, the electroconductive connector 30 connected thereto, and then via the electrode pad 18B, the island portion 13B, the torsion bar 15b connected thereto and the island portion 12B in the micromirror unit U.

Further, under the ground connection status, granting a desired potential to the comb electrode 17C so as to generate an electrostatic attraction between the comb electrodes 16C and 17C, or granting a desired potential to the comb electrode 17D so as to generate an electrostatic attraction between the comb electrodes 16D and 17D in each micromirror unit U, rotationally displaces the inner frame 12 with the mirror base 11 around the pivotal central axis A2. The inner frame 12 is rotationally displaced by such an angle where the generated electrostatic attraction and a total sum of the torsional resistance of the pair of torsion connectors 15 are equilibrated. The amount of the rotational displacement can be controlled by adjusting the potential granted to the comb electrode 17C or 17D. The potential can be granted to the comb electrode 17C in a desired micromirror unit U via the predetermined pin 51 of the connector 50, one of the electrode pads 22 on the package base 20, the internal multilayer interconnect structure and the electrode pad 21c, the electroconductive connector 30 connected thereto, and then via the electrode pad 18C and the island portion 13C in the micromirror unit U. To the comb electrode 17D in the desired micromirror unit U, the potential can be granted via the predetermined pin 51 of the connector 50, one of the electrode pads 22 on the package base 20, the internal multilayer interconnect structure and the electrode pad 21d, the electroconductive connector 30 connected thereto, and then via the electrode pad 18D and the island portion 13D in the micromirror unit U.

In each micromirror unit U, pivotally driving thus the movable unit (mainly the mirror base 11 and the inner frame 12) allows switching as desired the direction of the light reflected by the mirror surface 11*a* provided on the mirror base 11.

To manufacture the micromirror device X, firstly the electroconductive connectors 30 are formed on the package base 20 fabricated as above. More specifically, a predetermined wire bonding equipment is employed to form the ball bumps 31 on each of the electrode pads 21*a* to 21*d*, and another ball bump 31 is formed atop each ball bump 31. The ball bump 31 may be constituted of Au, for example. The ball bump 31 may have a diameter of approx. 50 μm. The following step in the formation of the electroconductive connector 30 is a leveling process of the bi-level ball bumps 31, of pressing a flat substrate such as a glass plate against the top of all the upper ball bumps at a time. Thus, the plurality of electroconductive connectors 30 or bi-level bumps with reduced fluctuation in height can be obtained. It is preferable that the fluctuation in height among the electroconductive connectors 30 or bi-level bumps is 10 μm or less.

To manufacture the micromirror device X, a thermosetting conductive adhesive is applied to a top portion of all the upper ball bumps 31. Specifically, for example, pressing the electroconductive connectors 30 with the package base 20 against a flat substrate on which the conductive adhesive is uniformly applied in a thickness of 25 μm enables transferring the conductive adhesive to the top portion of all the upper ball bumps 31. Alternatively, a predetermined dispensing equipment may be employed to apply the conductive adhesive to the top portion of all the upper ball bumps 31.

Thereafter, a predetermined flip-chip bonding equipment is employed to place the micromirror substrate 10 separately fabricated on the package base 20 through a positioning process, and then the micromirror substrate 10 and the package base 20 are subjected to pressure and heat, to be thereby joined via the electroconductive connectors 30. Concurrently, because of the solidification of the conductive adhesive, the electroconductive connectors 30 or the bi-level bumps are bonded to the electrode pads 18A to 18D on the micromirror substrate 10. Consequently, the micromirror substrate 10 is fixed to the package base 20, and electrical connection is achieved between the electrode pads 18A to 18D on the micromirror substrate 10 and the internal multilayer interconnect structure in the package base 20.

The next step in manufacturing the micromirror device X is attaching the connector 50 to the package base 20. Specifically, the solder bumps 53 are formed on the electrode pads 22 of the package base 20, and then the foregoing respective electrode pads of the connector 50 are brought into contact with the solder bumps 53 and reflow soldering is performed, thus to join the respective electrode pads and the respective solder bumps 53.

To manufacture the micromirror device X, finally the cap unit 40 is attached to the package base 20. Specifically, the ring 41 is first joined to the package base 20. In this process, for example a silver blazing metal may be employed. Then the metal frame 42*b* of the lid 42 and the ring 41 are seam-welded. Here, the transparent portion 42*a* and the metal frame 42*b* are to be joined in advance thus to prepare the lid 42. Providing such cap unit 40 allows air-tightly sealing the micromirror substrate 10 by the cooperation of the cap unit 40 and the package base 20. That is an example of the manufacturing method of the micromirror device X.

In the micromirror device X, an ordinary interconnect substrate is not interposed between the micromirror substrate 10 and the package base 20. The micromirror substrate 10 is fixed to the package base 20 via the electroconductive connectors 30, interposed between the micromirror unit U on the micromirror substrate 10 and the package base 20. Each electroconductive connector 30 also serves to electrically connect the actuator (constituted of a pair of opposing comb electrodes) in the micromirror unit U on the micromirror substrate 10 and the internal interconnect structure in the package base 20. The electroconductive connectors 30 are joined to the electrode pads 18A to 18D of the micromirror unit U and to the electrode pads 21*a* to 21*d* on the package base 20. Accordingly, the manufacturing process of the micromirror device X can exclude routing the interconnect pattern on the surface of the interconnect substrate and the complicated interconnect pattern on the surface of the package base 20, as well as the wire bonding process for achieving electrical connection between the electrode pads 18A to 18D on the micromirror substrate 10 and the electrode pads 21*a* to 21*d*. Therefore, the micromirror device X is advantageous for improving the production efficiency.

In the micromirror device X, the micromirror substrate 10 is securely and stably joined to the package base 20, via the electroconductive connectors 30. Because of the sintering process performed for fabricating the package base 20, considerable warp and surface distortion would be incurred unless appropriate measure were taken. In this embodiment, however, the polishing process applied to the first surface 20*a* achieves sufficient flatness of the first surface 20*a*. Besides, because of the leveling process of the electroconductive connectors 30 performed in this embodiment, the fluctuation in height among the electroconductive connectors 30 can be suppressed within a practically acceptable extent. Executing such polishing and leveling process allows securely and stably joining the micromirror substrate 10 via the electroconductive connectors 30 to the package base 20, despite the warp and surface distortion thereof, which might otherwise impose difficulty.

In the micromirror device X, the electroconductive connectors 30, which electrically connect each actuator (pair of opposing comb electrodes) in the micromirror unit U and the internal multilayer interconnect structure in the package base 20, include two conductive paths. Such structure effectively prevents imperfect electrical connection between the internal multilayer interconnect structure in the package base 20 and the respective actuators via the electroconductive connectors 30. This is because, even though one of the conductive paths should be disconnected, the other conductive path can keep performing the conduction.

In the micromirror device X, the respective conductive paths of the electroconductive connectors 30 include a plurality of levels (in this embodiment, two levels) of ball bumps 31. Such structure is advantageous in providing a high conductive path or the electroconductive connector 30 in a small region on the package base 20. Providing the high conductive path or the electroconductive connector 30 in a small region on the package base 20 is beneficial in securing a sufficient gap between the micromirror substrate 10 and the package base 20, yet achieving high-density positioning of the micromirror unit U. According to the present invention, the number and size of the ball bumps 31 to constitute the respective conductive paths can be appropriately determined according to the spacing required between the micromirror substrate 10 and the package base 20.

Figure 12:
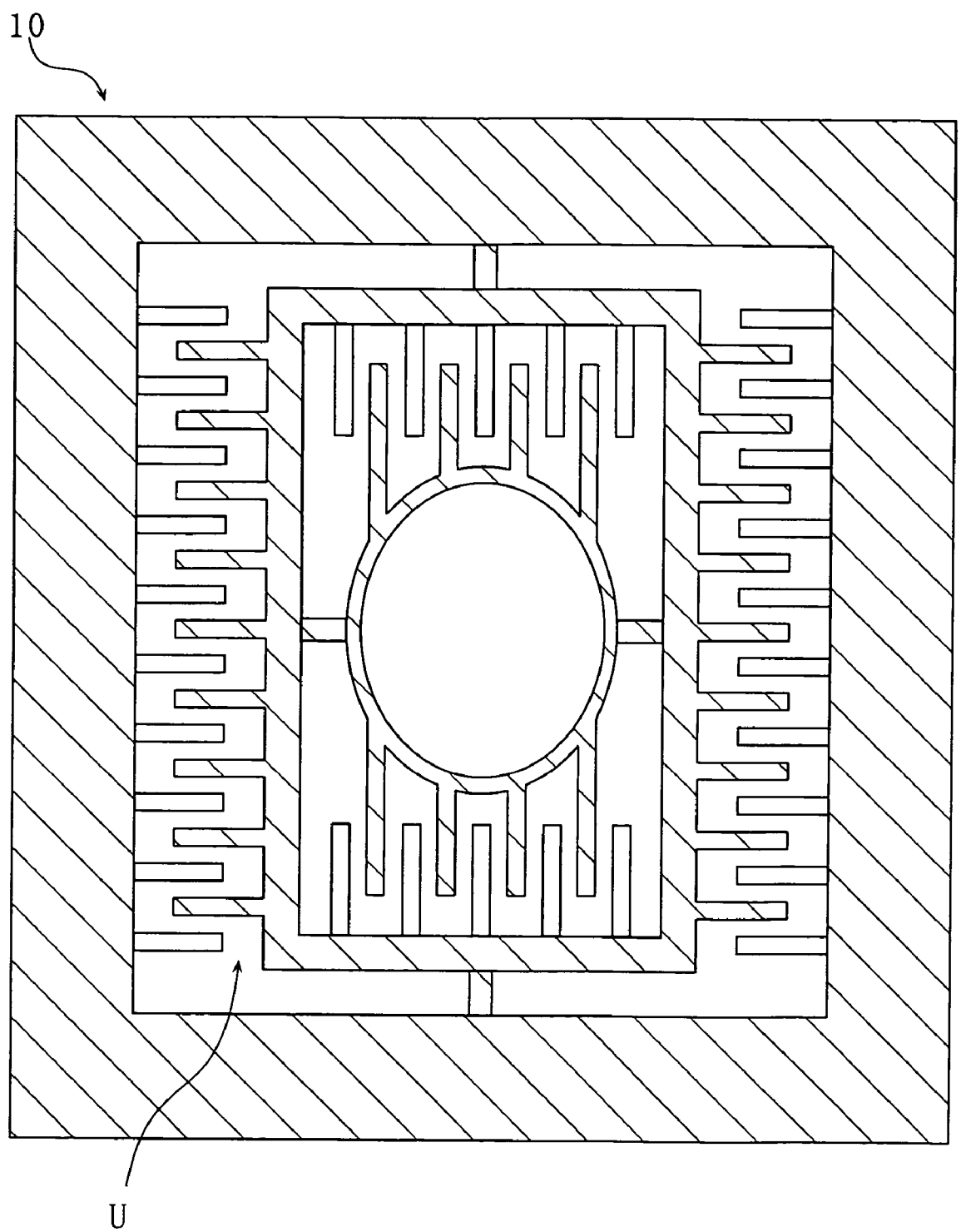
FIG. 12 is a plan view showing a micromirror substrate in a first variation of the micromirror device according to the first embodiment.

FIG. 12 is a plan view showing a micromirror substrate 10 in a first variation of the micromirror device X. In the micromirror device X, a single micromirror unit U as shown in FIG. 12 may be employed, in place of the foregoing plurality of micromirror units U. In accordance with such single micromirror unit U, the design dimensions of the micromirror substrate 10, the package base 20, the cap unit 40, and the connector 50 are to be appropriately revised, and the interconnect structure (interconnect pattern profile, number of electrode pads and so on) in the package base 20 and the connector 50 is also to be modified.

Figure 13:
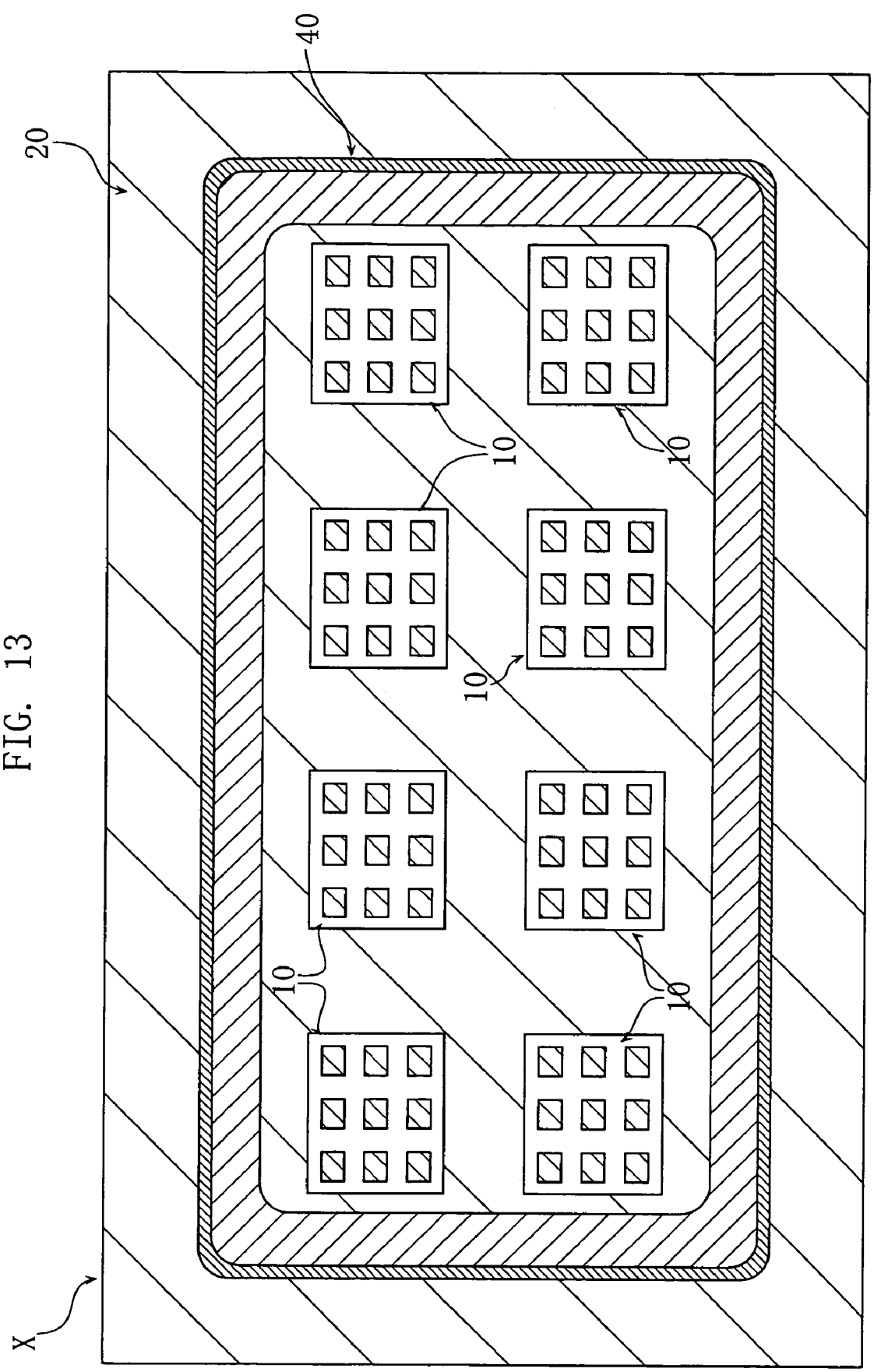
FIG. 13 is a plan view showing a micromirror device according to a second variation from the first embodiment.
Figure 14:
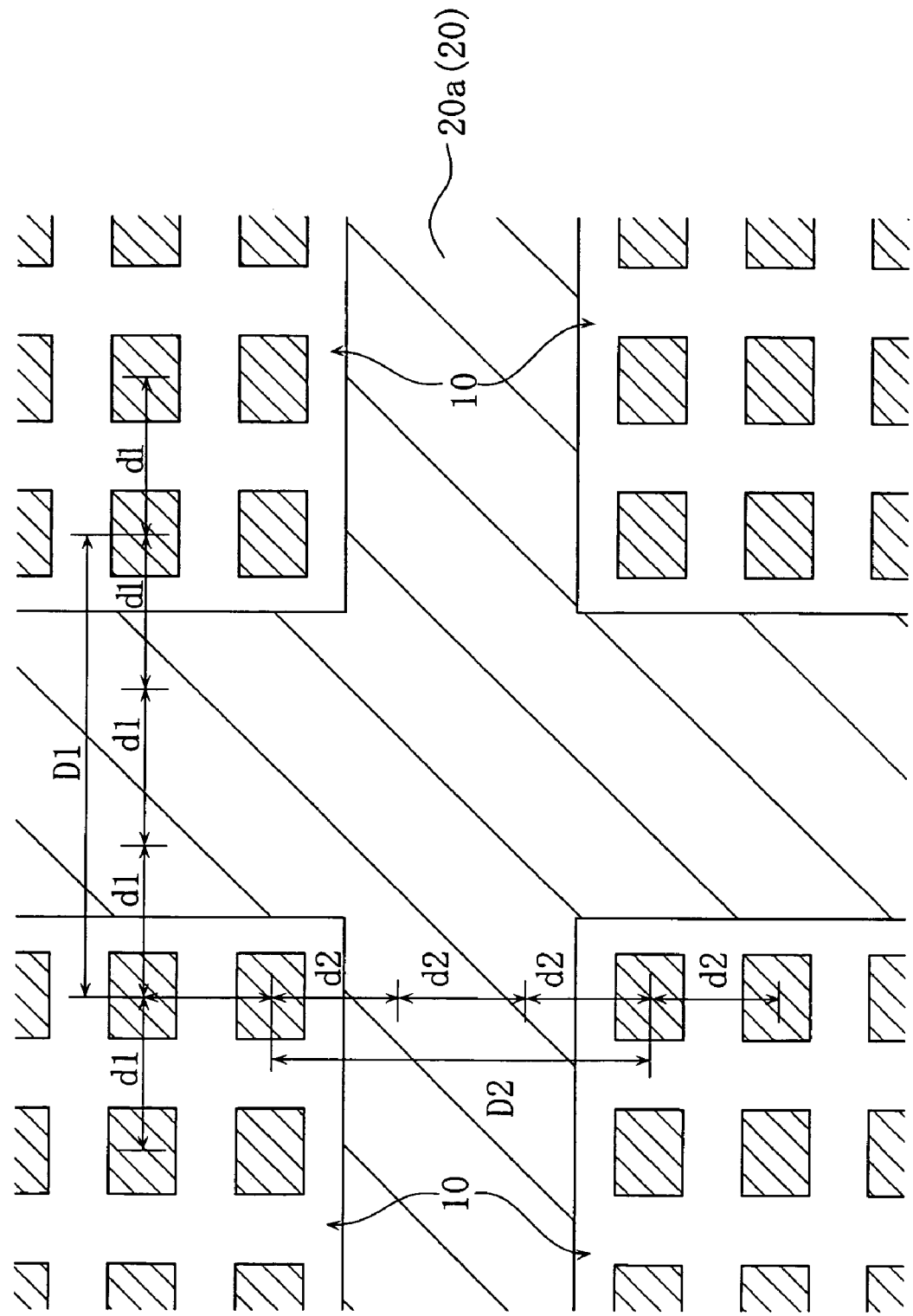
FIG. 14 is an enlarged fragmentary plan view showing the second variation.

FIG. 13 is a plan view showing the micromirror device X according to a second variation. In the micromirror device X, a plurality of micromirror substrates 10 may be provided as shown in FIG. 13, in place of the single micromirror substrate 10. For the sake of simplicity of the drawings, the specific structure of the micromirror units U in the micromirror substrate 10 will be omitted in FIG. 13 and in FIG. 14 to be described below, and the regions where the movable units are provided in the micromirror substrate 10 will be schematically indicated by rectangles. In this variation, eight micromirror substrates 10 are arranged in a 2×4 matrix (that is, a matrix having two rows and four columns). The four columns are arranged at regular intervals (that is, the four columns are equally spaced in the horizontal direction, i.e. in the row-extending direction). The eight micromirror substrates 10 are spaced from one another, such that, as shown in FIG. 14, the interval between closest two movable units D1, D2 (between the center lines of the movable units) respectively located on two adjacent micromirror substrates 10 is integer times (three times in both directions in this embodiment) as wide as the interval between the movable units d1, d2 on the single micromirror substrate 10, along the spacing direction of the adjacent micromirror substrates 10. It is preferable that the plurality of micromirror substrates 10 is orderly aligned in such a manner. In accordance with such eight micromirror substrates 10, the design dimensions of the package base 20, the cap unit 40, and the connector 50 are to be appropriately revised, and the interconnect structure (interconnect pattern profile, number of electrode pads and so on) in the package base 20 and the connector 50 is also to be modified.

Figure 15:
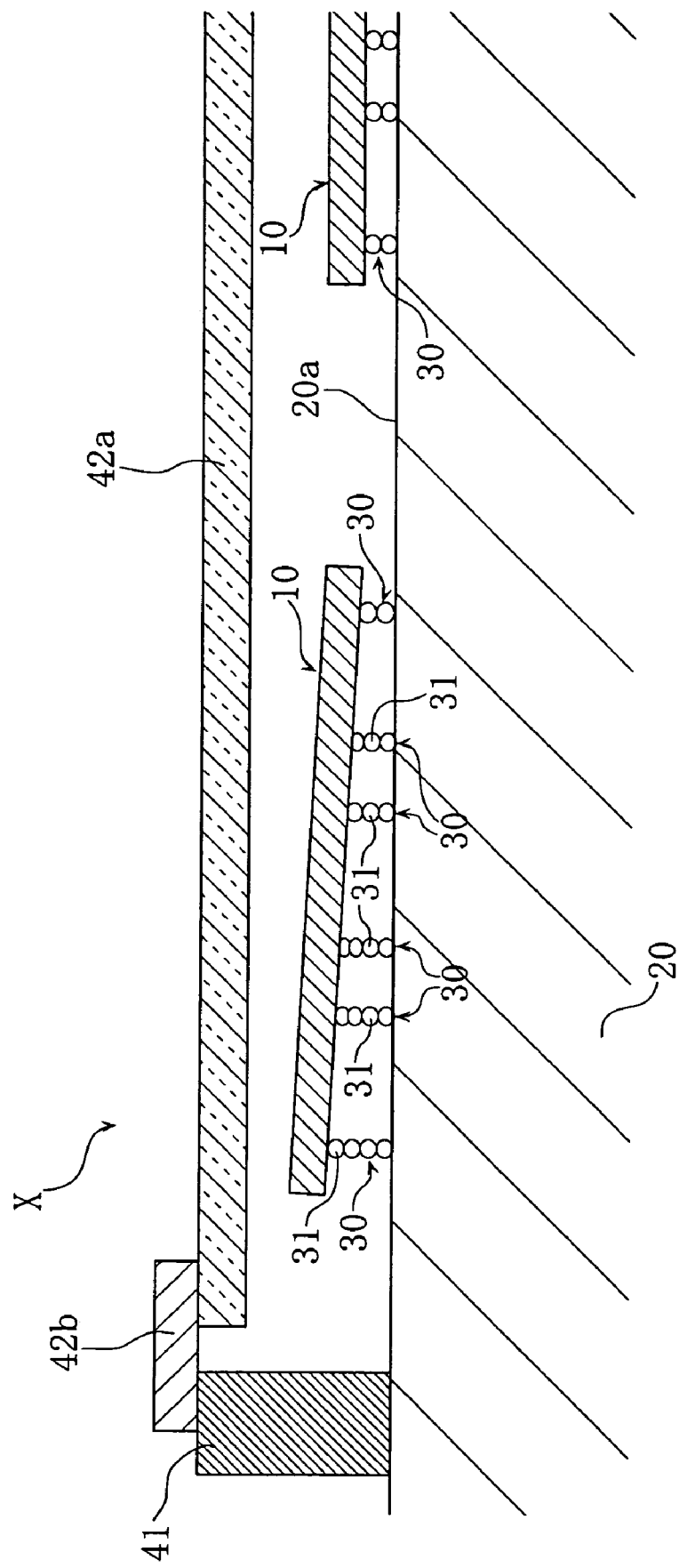
FIG. 15 is an enlarged fragmentary cross-sectional view showing the second variation.

In the second variation, the micromirror substrates 10 located at the left end and/or right end in FIG. 13 may preferably be inclined by a predetermined angle with respect to the package base 20, as shown in FIG. 15. In the micromirror device X, the mirror base 11 or mirror surface 11a located in a farther peripheral position is often required to perform wider pivotal movement, and hence it is preferable to incline in advance predetermined micromirror substrates 10 located at the outermost end with respect to the package base 20. Placing the micromirror substrate 10 with an inclination with respect to the package base 20 reduces the rotational displacement require d from the mirror base 11 in the inclined micromirror substrate 10. The inclination angle of the predetermined micromirror substrate 10 can be adjusted by appropriately setting the number of levels and size of the ball bumps 31 to constitute the predetermined electroconductive connector 30 or the conductive path thereof.

Figure 16:
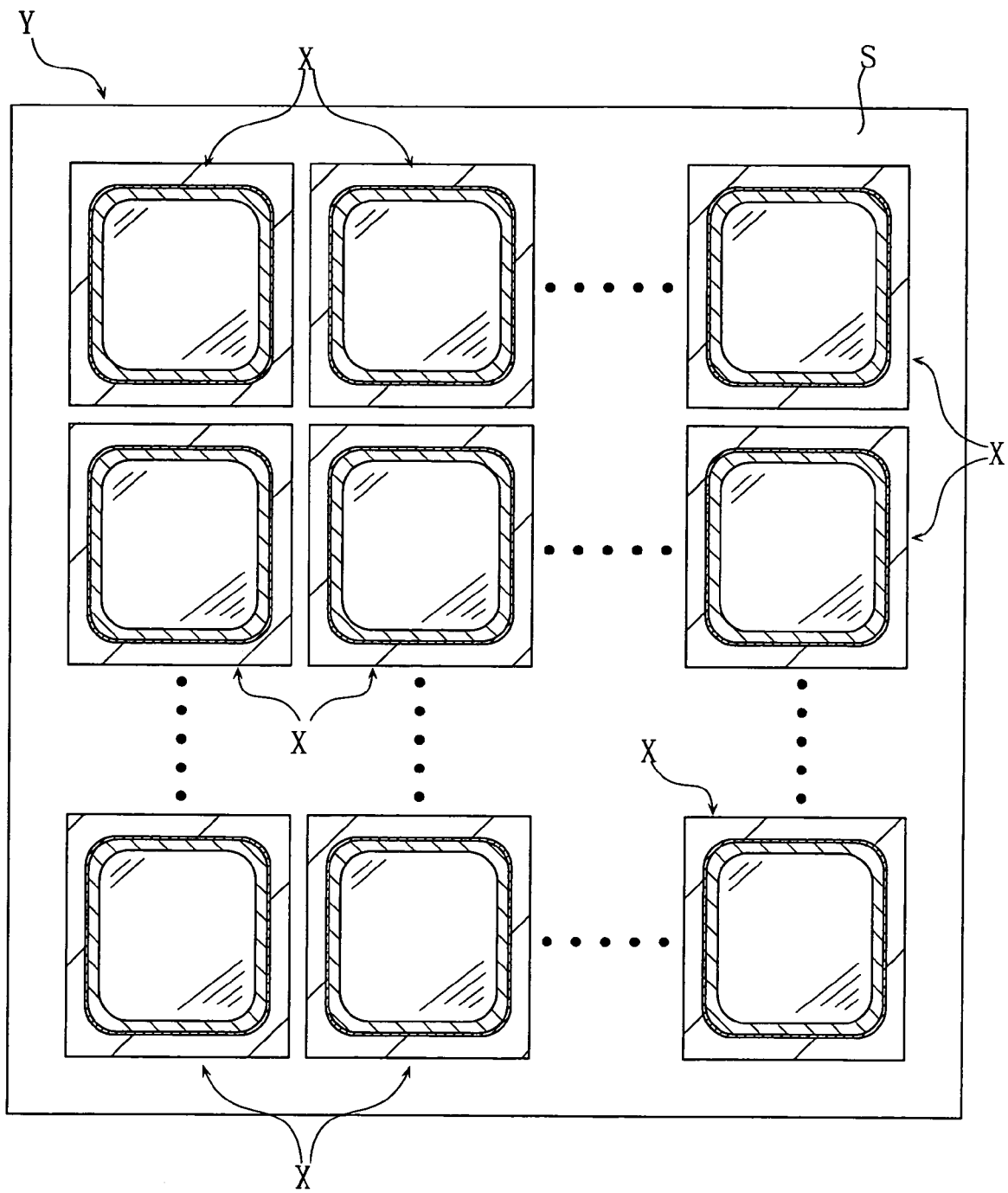
FIG. 16 is a partly omitted plan view showing an optical switching device according to a second embodiment of the present invention.
Figure 17:
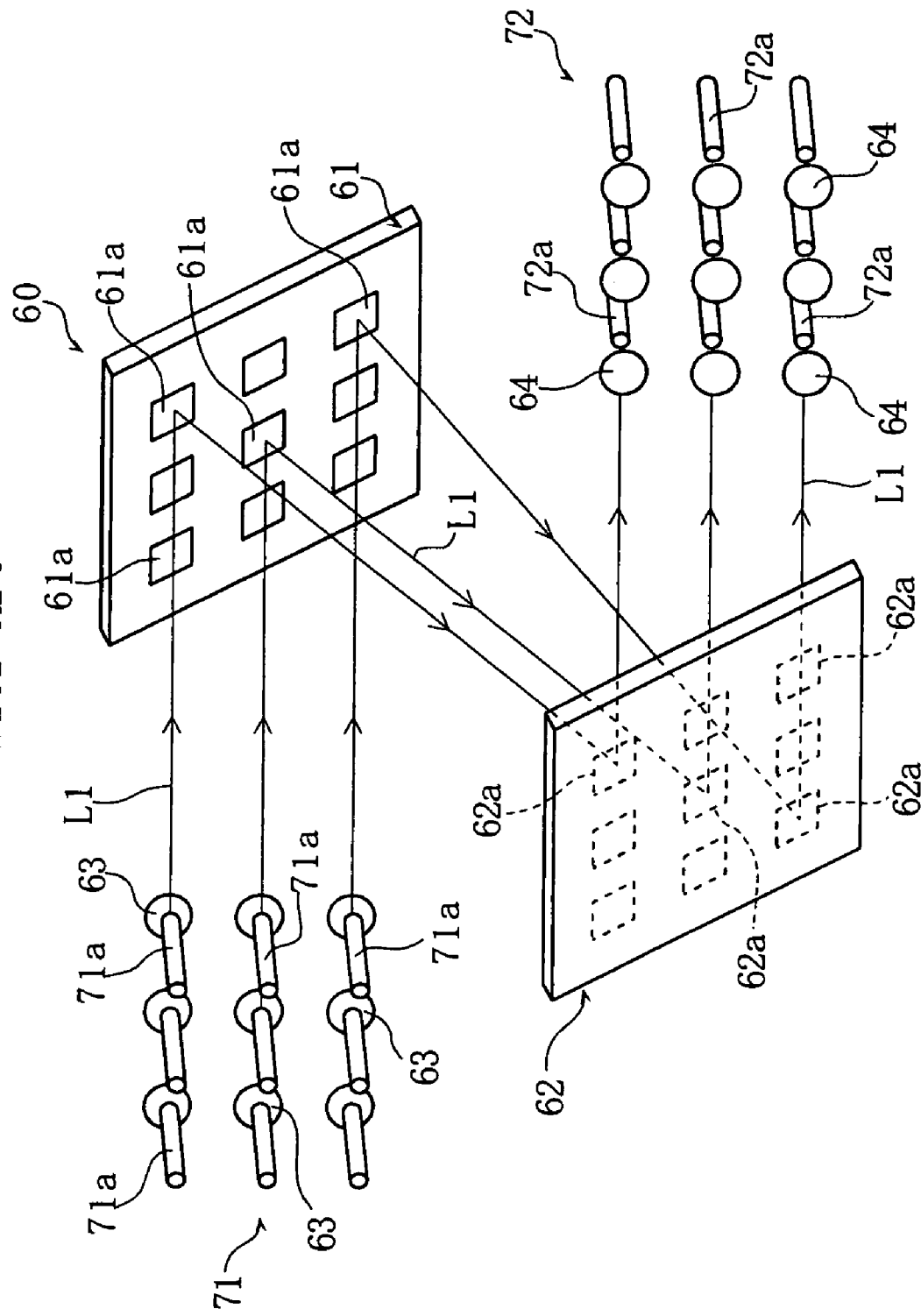
FIG. 17 is a schematic perspective view showing an optical switching device.
Figure 18:
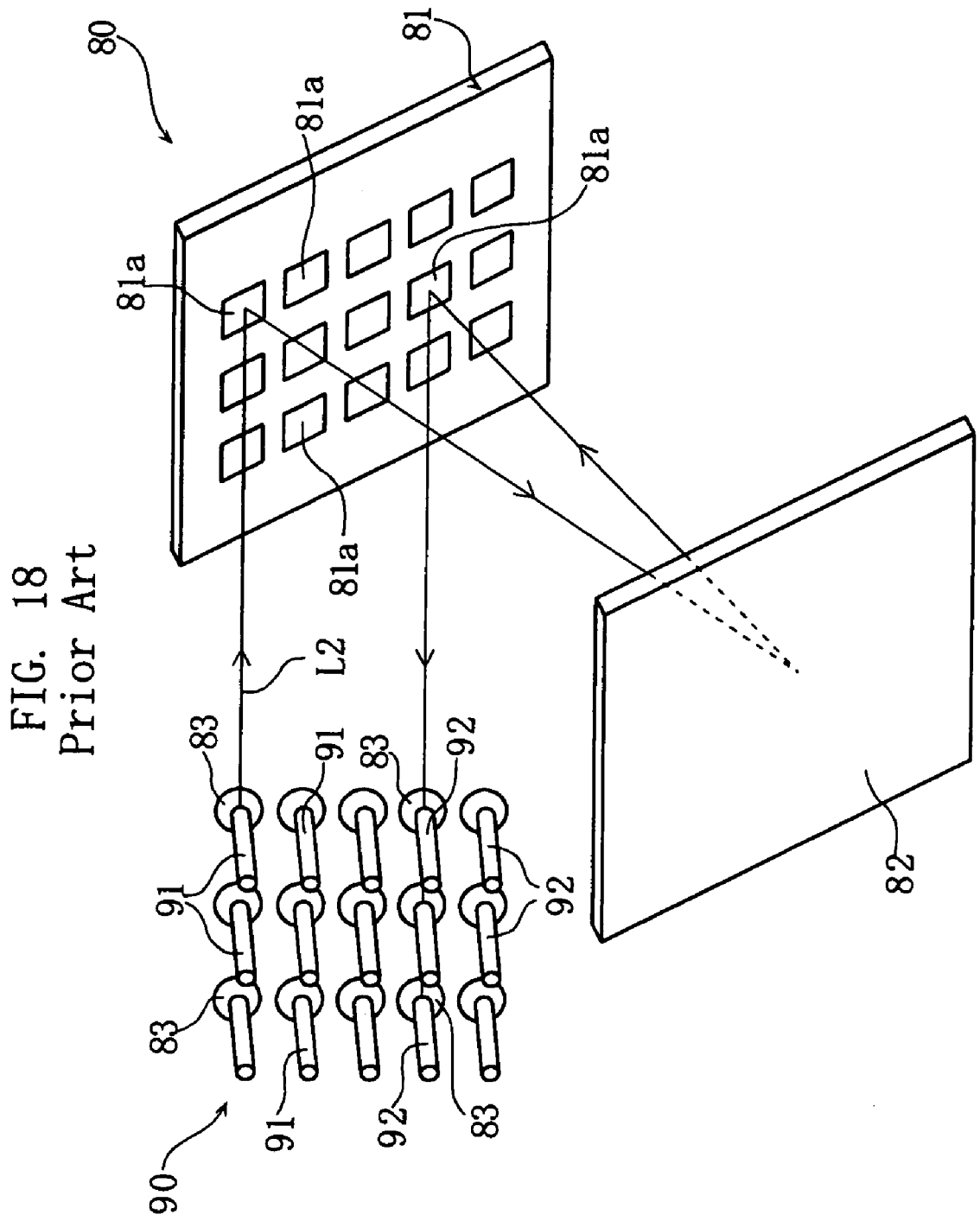
FIG. 18 is a schematic perspective view showing another optical switching device.

FIG. 16 is a partly omitted plan view showing an optical switching device Y according to a second embodiment of the present invention. The optical switching device Y includes a plurality of the micromirror devices X mounted on a predetermined base material S. For the sake of simplicity of the drawing, the micromirror substrate 10 in the respective micromirror devices X is omitted in FIG. 16. As already stated, the micromirror device X is beneficial in improving the production efficiency. Hence naturally, the optical switching device Y is also beneficial for performing more efficient production.

According to the present invention, utilizing the pair of comb electrodes 16A, 17A and the pair of comb electrodes 16B, 17B in the micromirror unit U of the micromirror device X as a detecting unit that detects fluctuation of electrostatic capacitance between the pair of electrodes, instead of as the actuator, leads to constituting a gyro sensor. In this case, a non-transparent material may be employed in the cap unit 40, in place of the transparent portion 42a.

The present invention being thus described, it is obvious that the same may be varied in many ways. Such variations are not to be regarded as a departure from the spirit and scope of the present invention, and all such modifications as would be obvious to those skilled in the art are intended to be included within the scope of the following claims.

The invention claimed is:

1. A micro movable element, comprising:
a micro movable substrate provided with a micro movable unit that includes a frame, a pivotally movable portion, a torsion connector connecting the frame and the movable portion to each other, and an actuator for generating a driving force for pivotal motion of the movable portion;
a package base including a first surface facing the micro movable substrate, a second surface opposite to the first surface, and an internal interconnect structure; and
an electroconductive connector provided between the micro movable substrate and the package base for electrically connecting the actuator and the internal interconnect structure to each other;
wherein the first surface of the package base is provided with an interconnect pattern electrically connected to the internal interconnect structure of the package base, the second surface of the package base being provided with a plurality of electrode pads electrically connected to the interconnect pattern on the first surface of the package base via the internal interconnect structure of the package base.

2. The micro movable element according to claim 1, wherein the package base is mainly made of ceramics.

3. The micro movable element according to claim 1, wherein the interconnect pattern on the first surface of the package base includes a plurality of electrode pads arranged differently from the electrode pads on the second surface of the package base.

4. The micro movable element according to claim 1, wherein the electroconductive connector fixedly supports the micro movable substrate.

5. The micro movable element according to claim 3, wherein the electroconductive connector includes a plurality of conductive paths in electrical connection to each of the electrode pads on the first surface of the package base.

6. The micro movable element according to claim 5, wherein each of the conductive paths comprises a plurality of stacked conductive bumps.

7. The micro movable element according to claim 1, further comprising a cap structure for sealing the micro movable substrate in cooperation with the package base, wherein the cap structure includes an annular wall and a lid, the annular wall being joined to the package base and surrounding a region of the package base at which the micro movable substrates is provided, the lid being disposed to face the micro movable substrate.

8. The micro movable element according to claim 7, wherein the lid includes a transparent portion that transmits light.

9. The micro movable element according to claim 8, wherein the transparent portion has a light transmittance of no smaller than 90%.

10. The micro movable element according to claim 8, further comprising an optical band-pass filter provided on the transparent portion.

11. The micro movable element according to claim 7, wherein the annular wall is made of metal at least at a surface thereof.

12. The micro movable element according to claim 1, further comprising a connector unit for external connection, the connector being electrically connected to the package base.

13. The micro movable element according to claim 12, wherein the connector unit is connected to the electrode pads on the second surface of the package base.

14. An optical switching device, comprising a plurality of the micro movable elements according to claim 1.

15. A micro movable element, comprising:
a micro movable substrate integrally formed with a plurality of micro movable units, each micro movable unit including a frame, a pivotally movable portion, a torsion connector connecting the frame and the movable portion to each other, and an actuator for generating a driving force for pivotal motion of the movable portion;
a package base including a first surface facing the micro movable substrate, a second surface opposite to the first surface, and an internal interconnect structure; and
a plurality of electroconductive connectors provided between the micro movable substrate and the package base, each electroconductive connector electrically connecting the actuator of a corresponding one of the micro movable units to the internal interconnect structure;
wherein the first surface of the package base is provided with an interconnect pattern electrically connected to the internal interconnect structure of the package base, the second surface of the package base being provided with a plurality of electrode pads electrically connected to the interconnect pattern on the first surface of the package base via the internal interconnect structure of the package base.

16. The micro movable element according to claim 15, wherein fluctuation in height among the plurality of electroconductive connectors is no greater than 10 μm.

17. The micro movable element according to claim 15, wherein the plurality of movable portions of the respective micro movable units are arranged in an m×n matrix (m is an integer≧1; n is an integer≧2), the movable portions being equally spaced in at least one of a row-extending direction and a column-extending direction.

18. A micro movable element, comprising:
a plurality of micro movable substrates each integrally formed with a plurality of micro movable units, each micro movable unit including a frame, a pivotally movable portion, a torsion connector connecting the frame and the movable portion to each other, and an actuator for generating a driving force for pivotal motion of the movable portion;
a package base including a first surface facing the micro movable substrates, a second surface opposite to the first surface, and an internal interconnect structure; and
a plurality of electroconductive connectors provided between the respective micro movable substrates and the package base, the connectors being provided to electrically connect the actuators of the respective micro movable units of each micro movable substrate to the internal interconnect structure;
wherein the first surface of the package base is provided with an interconnect pattern electrically connected to the internal interconnect structure of the package base, the second surface of the package base being provided with a plurality of electrode pads electrically connected to the interconnect pattern on the first surface of the package base via the internal interconnect structure of the package base.

19. The micro movable element according to claim 18, wherein the plurality of micro movable substrates are arranged in a p×q matrix (p is an integer≧1; n is an integer≧2).

20. The micro movable element according to claim 18, wherein the plurality of micro movable substrates comprise a first micro movable substrate and a second micro movable substrate that are adjacent to each other but spaced from each other in a separating direction, wherein a smallest distance in the separating direction between the movable portions of the first micro movable substrate and the movable portions of the second micro movable substrate is an integer multiple of an interval in the separating direction at which the movable portions are arranged in each of the first and the second micro movable substrates.

* * * * *